US012638597B2

(12) United States Patent 
Wu et al.

(10) Patent No.: US 12,638,597 B2 
(45) Date of Patent: May 26, 2026

(54) CONVERGENT TRACKING FOR NAVIGATION SYSTEM USING AN UPDATE DETERMINED FROM SUBCARRIER AND CODE ERROR

(71) Applicant: L3Harris Technologies, Inc., Melbourne, FL (US)

(72) Inventors: Shuwu Wu, Yorba Linda, CA (US); Robert Mason Fries, Irvine, CA (US); Roy Michael Gentry, Manhattan Beach, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 330 days.

(21) Appl. No.: 18/543,079

(22) Filed: Dec. 18, 2023

(65) Prior Publication Data

US 2025/0199186 A1     Jun. 19, 2025

(51) Int. Cl.
 *G01S 19/30* (2010.01)
 *G01S 19/29* (2010.01)
(52) U.S. Cl.
 CPC .............. *G01S 19/30* (2013.01); *G01S 19/29* (2013.01)
(58) Field of Classification Search
 CPC ................................. G01S 19/29; G01S 19/30
 USPC ...................................................... 342/357.68
 See application file for complete search history.

(56) References Cited

U.S. PATENT DOCUMENTS

| 8,964,813 | B2 | 2/2015 | Hodgart et al. | |
|---|---|---|---|---|
| 9,184,973 | B2 * | 11/2015 | Yu | H04B 1/7087 |
| 2009/0219201 | A1 * | 9/2009 | Martin | G01S 19/32 |
| | | | | 342/357.62 |
| 2011/0261805 | A1 * | 10/2011 | Landry | G01S 19/31 |
| | | | | 375/E1.003 |

(Continued)

OTHER PUBLICATIONS

Paul Fine, et al., "Tracking Algorithm for GPS Offset Carrier Signals", Proceedings of the 1999 National Technical Meeting of The Institute of Navigation, San Diego, CA, Jan. 1999, pp. 671-676.

(Continued)

*Primary Examiner* — Brady W Frazier 
(74) *Attorney, Agent, or Firm* — Edell, Shapiro & Finnan, LLC

(57) ABSTRACT

An embodiment provides convergent tracking for Global Navigation Satellite System (GNSS) signals (e.g., binary offset carrier (BOC), etc.) in GNSS applications, such as positioning, navigation, timing, and guidance. The embodiment employs a situation-aware two-dimensional (2D) routing algorithm that provides fast convergence to stable tracking. Further, an embodiment may provide subcarrier phase ambiguity resolution that resolves carrier phase with assurance to support high integrity navigation, including high integrity real-time kinematic (RTK) applications. Moreover, an embodiment may provide tracking to more accurate subcarrier phase estimates. This may provide up to four times better ranging accuracy. Accordingly, an embodiment provides robust tracking performance of BOC signals under varying levels of dynamics, high jamming tolerance, more ranging accuracy, support for high integrity navigation, and support for high integrity RTK based positioning and high precision navigation and automatic landing.

20 Claims, 13 Drawing Sheets

(56)                References Cited

U.S. PATENT DOCUMENTS

| | | | | |
|---|---|---|---|---|
| 2014/0191903 | A1* | 7/2014 | Vigneau | G01S 19/29 |
| | | | | 342/357.68 |
| 2015/0200800 | A1* | 7/2015 | Yu | G01S 19/24 |
| | | | | 375/343 |
| 2016/0377727 | A1* | 12/2016 | Jardak | G01S 19/30 |
| | | | | 342/357.26 |
| 2016/0377729 | A1* | 12/2016 | Jardak | G01S 19/33 |
| | | | | 342/357.27 |
| 2019/0268036 | A1* | 8/2019 | Macleod | G01S 19/30 |
| 2021/0199812 | A1* | 7/2021 | Cheng | G01S 19/243 |
| 2021/0242899 | A1* | 8/2021 | Macleod | H04B 1/7085 |
| 2022/0299654 | A1* | 9/2022 | Lee | G01S 19/32 |

OTHER PUBLICATIONS

M.S. Hodgart, et al., "The Optimal Dual Estimate Solution for Robust Tracking of Binary Offset Carrier (BOC) Modulation", Proceedings of the 20th International Technical Meeting of the Satellite Division of The Institute of Navigation (Ion GNSS 2007), Fort Worth, TX, Sep. 2007, pp. 1017-1027.
Ronald L. Fante, "Unambiguous Tracker for GPS Binary-Offset-Carrier Signals", Apr. 2003, 5 pages.
Daniele Borio, "Double phase estimator: new unambiguous binary offset carrier tracking algorithm", IET Radar, Sonar & Navigation 8, No. 7 (2014): 729-741.
John W. Betz, "Binary Offset Carrier Modulations for Radionavigation", Navigation vo. 48, No. 4 (2001): 227-246.

* cited by examiner

FIG.1A  PSEUDO-RANDOM SEQUENCE 110

FIG.1B  SUBCARRIER 120

FIG.1C  BOC 130

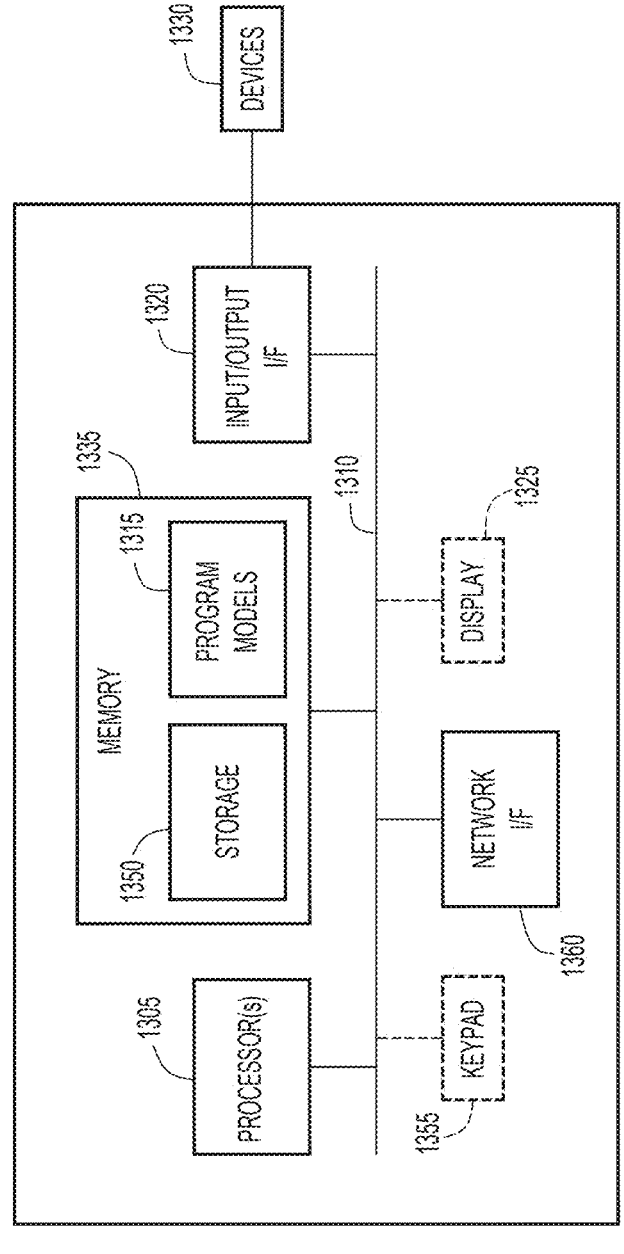
FIG.13

CONVERGENT TRACKING FOR NAVIGATION SYSTEM USING AN UPDATE DETERMINED FROM SUBCARRIER AND CODE ERROR

STATEMENT REGARDING FEDERALLY SPONSORED RESEARCH OR DEVELOPMENT

This invention was made with government support under Contract No. FA8807-21-C-0005 awarded by U.S. Space Force. The government has certain rights in the invention.

TECHNICAL FIELD

The present disclosure relates to tracking for navigation systems and, more specifically, to post-acquisition code and subcarrier phase pull-in and tracking of global navigation satellite system (GNSS) signals (e.g., binary offset carrier (BOC) signals, etc.) to provide for GNSS-based positioning, navigation, and timing applications, robust performance against high jamming, and support for high integrity navigation including high integrity real-time kinematic (RTK) applications. An embodiment applies to post-acquisition tracking of any GNSS signal with one or more modulation components, such as BOC, which satisfy the following three criteria: (1) the modulation component or components is or are in addition to the ranging code modulation; (2) the modulation component or components taken as a group or separately and with the ranging code modulation form a multidimensional correlation surface or volume, denoted as the space; and (3) movement along the aforementioned space to an optimal or near optimal correlation point for stable tracking in the space cannot be reliably accomplished starting from an arbitrary point in the space using a set of one-dimensional error discriminators; this is due to the mathematically inseparable nature of multi-dimensional correlation characteristics. The approach of the embodiment of employing a true 2-dimensional (2D) or N-dimensional (N-D) algorithm that solves the underlying inseparable 2D or N-D tracking mathematical problem extends its applicability into any GNSS signal, such as BOC, with one or modulation component(s) in addition to the ranging code modulation.

BACKGROUND

Global Navigation Satellite System (GNSS) modernization has resulted in increased use of the L-band spectrum via concurrent broadcast of signals. The concurrent usage is enabled by binary offset carrier (BOC) modulation which moves power of the signals away from the band center to provide separation from the transmitted signals that are in the same radio frequency (RF) band. The separation is accomplished using an additional modulation component referred to as the subcarrier. The BOC waveform is created through modulation of a carrier by a pseudorandom noise (PRN) sequence and a square wave subcarrier.

Although these signals provide significant advantages with respect to mitigating interference, the signals also present challenges with respect to high performance tracking due to the presence of multiple peaks in an autocorrelation function (ACF) of BOC signals. In this case, a receiver tracking loop may lock onto a secondary peak in the ACF, which results in a loss in recovered signal strength and reduced accuracy when compared to tracking the main peak of the ACF.

Various techniques may mitigate issues associated with the multi-peak BOC autocorrelation function (ACF) and improve BOC tracking performance. One approach (referred to as "Bump Jump") makes use of additional correlators to confirm that the correct peak is tracked. False peak tracking is detected in this scheme, but only after it has already occurred and with some uncertainty. Another approach to address the multi-peak issue (referred to as Fante's method) requires 12 to 14 code taps at various delays to form a composite BOC ACF mimicking a traditional triangular shape. Neither method is known to support an integrity allocation for a high assurance level for correct peak tracking (such as less than 1 in 100,000 erroneous chance) for high integrity applications.

In addition, double estimators (DEs) have been devised for enhancing tracking. Double estimators (DEs) employ separate tracking loops and form independent delay estimates for the subcarrier and the code. However, since double estimators (DEs) separately estimate subcarrier and code phases or delays (which effectively decomposes tracking into two one-dimensional (1D) mathematical problems), the DEs ignore strong coupling between the dimensions and are built on a weak mathematical foundation.

BRIEF DESCRIPTION OF THE DRAWINGS

FIG. 13 is a block diagram of an example computing device according to an embodiment of the present disclosure.

DESCRIPTION OF EXAMPLE EMBODIMENTS

Overview

An embodiment provides post-acquisition code and sub-carrier phase pull-in and tracking of global navigation satellite system (GNSS) signals (e.g., binary offset carrier (BOC) signals, etc.) to provide for GNSS-based positioning, navigation, and timing applications with robust performance against high jamming and support for high integrity navigation including high integrity real-time kinematic (RTK) applications. An embodiment provides a situation-aware two-dimensional (2D) routing algorithm that is used post-acquisition to provide fast convergence to stable tracking by iteration of: determining which region a current two-dimensional (2D) phase error resides using 2D correlation data; using this regional information with the 2D correlation data to calculate a situation-aware routing step vector (RSV); updating subcarrier and code phase numerically controlled oscillators (NCOs) in accordance with the RSV; and exiting iteration upon reaching stable tracking.

EXAMPLE EMBODIMENTS

Global navigation satellite system (GNSS) modernization has resulted in increased use of the L-band spectrum via concurrent broadcast of signals. The concurrent usage is enabled by binary offset carrier (BOC) modulation which moves power of the signals away from the band center to provide separation from transmitted signals that are in the same radio frequency (RF) band. The separation is accomplished using an additional modulation component referred to as a subcarrier.

Figure 1:
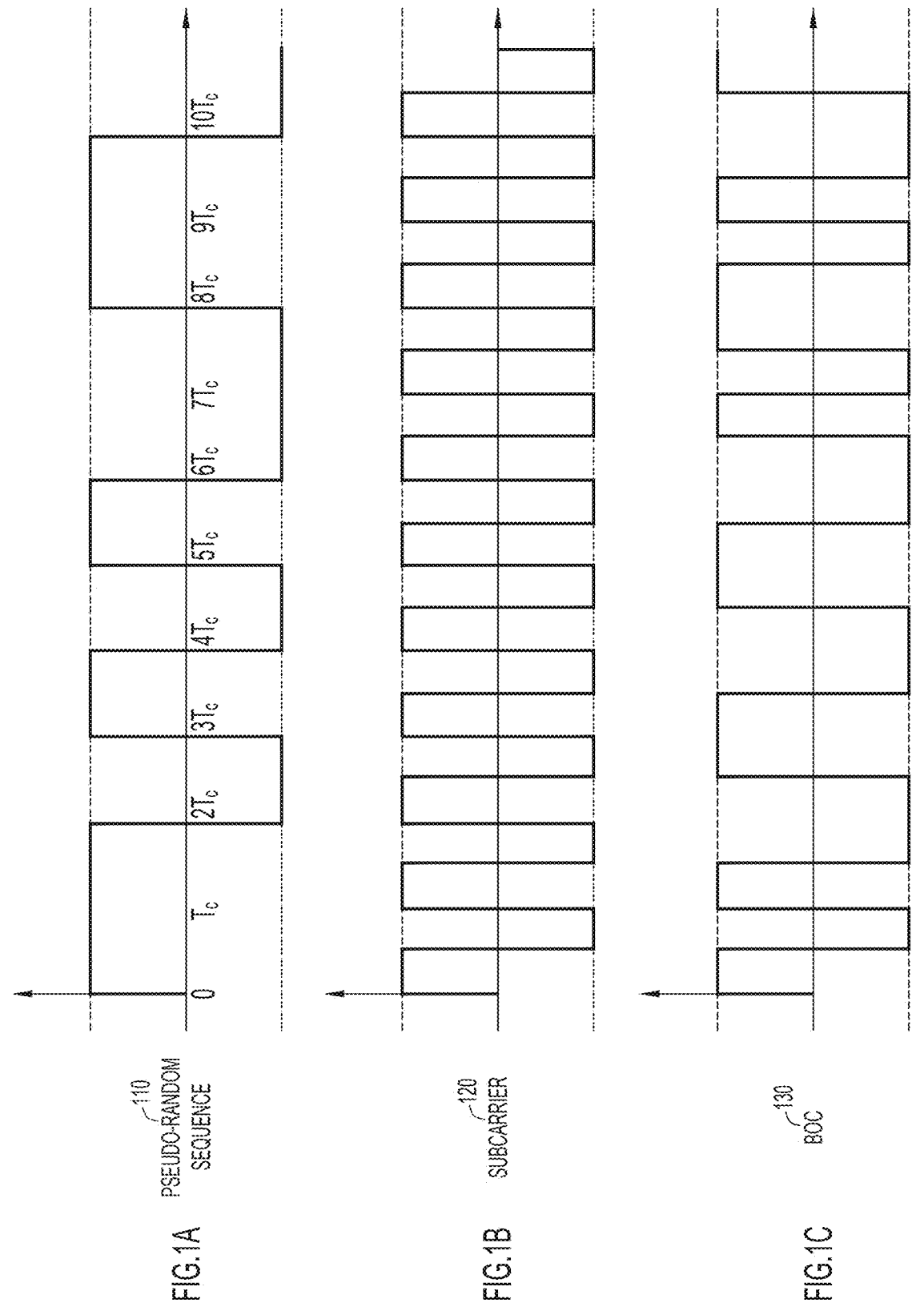
FIG. 1A is a graphical representation of an example pseudo-random number (PRN) sequence for GNSS code modulation.
FIG. 1B is a graphical representation of an example subcarrier signal (a square wave) for GNSS subcarrier modulation.
FIG. 1C is a graphical representation of an example binary offset carrier (BOC) signal formed from the signals of FIGS. 1A-1B.

An example binary offset carrier (BOC) waveform for use with present embodiments is illustrated in FIGS. 1A-1C. A BOC spreading signal 130 (FIG. 1C) may be created based on a modulated carrier signal 110 (FIG. 1A) and a square wave subcarrier 120 (FIG. 1B) applied to the modulated carrier signal. The carrier signal may be modulated by a pseudorandom noise (PRN) sequence. For example, the carrier signal may be a position reference signal (PRS) modulated using a binary phase shift keying (BPSK) or other modulation technique. In FIGS. 1A-1C, by way of example, $T_c$ represents a width of a code chip, while a width of subcarrier signal 120 is shown as one half of $T_c$ (or $T_c/2$) since it is modulated at twice a chipping rate.

Figure 2:
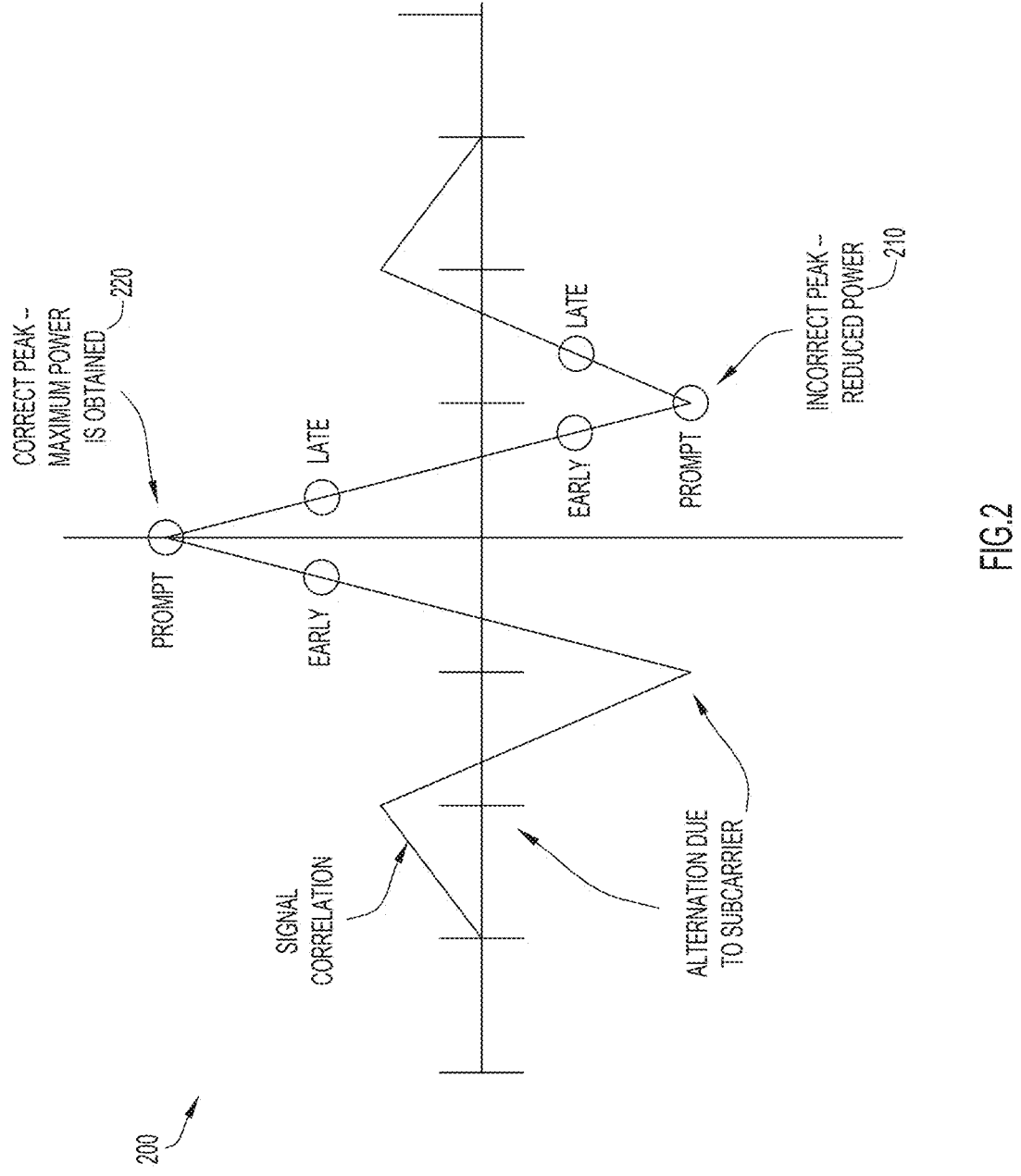
FIG. 2 is a graphical representation of an autocorrelation function of an example binary offset carrier (BOC) signal.

Although these signals provide significant advantages to mitigate interference, the signals present challenges with respect to high performance tracking due to presence of multiple peaks in an autocorrelation function (ACF) of binary carrier offset (BOC) signals. FIG. 2 illustrates a graphical representation 200 of an example autocorrelation function (ACF) of a BOC signal with multiple peaks. In this case, a receiver tracking loop may easily lock onto a secondary peak 210 in the ACF which results in a loss in recovered signal and reduced accuracy when compared to tracking a main peak 220 of the ACF.

Figure 3:
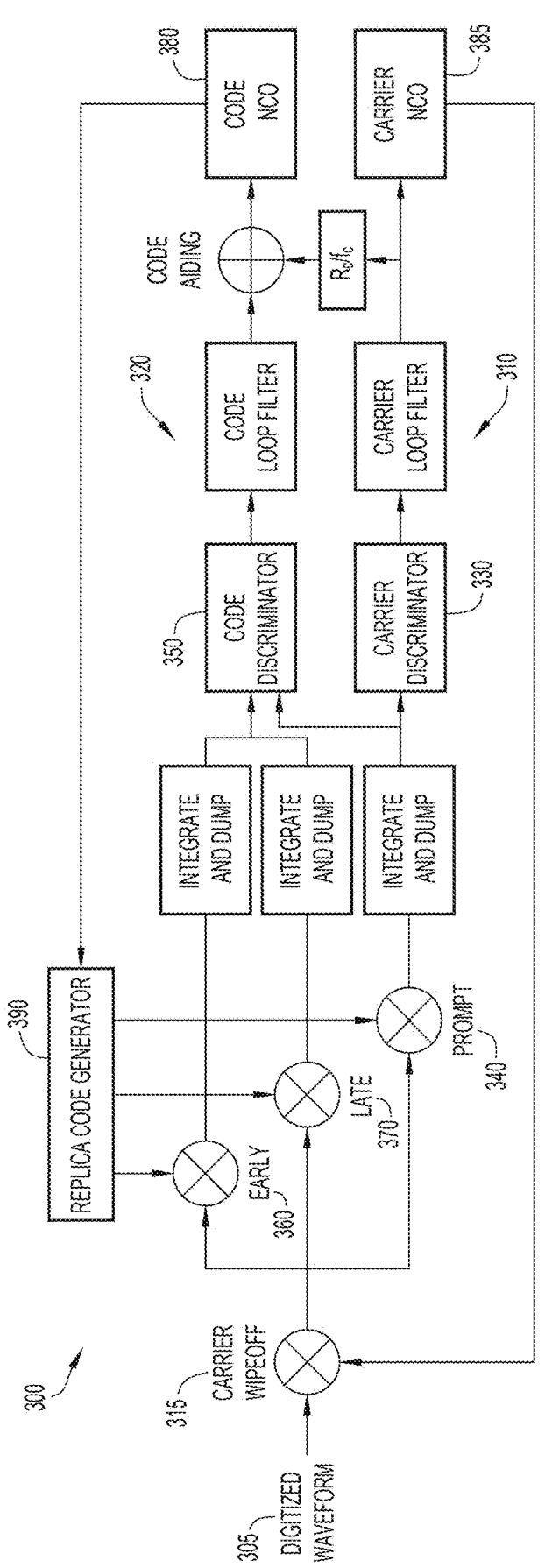
FIG. 3 is a block diagram of an example global navigation satellite system (GNSS) receiver.

A global navigation satellite system (GNSS) receiver 300 typically utilizes a carrier loop 310 and a code loop 320 for tracking as illustrated in FIG. 3. Typically, receiver 300 receives a signal 305 and employs code loop 320 aided by carrier loop 310. In this architecture, a carrier error discriminator 330 processes a prompt tap 340, and a code error discriminator 350 processes an early tap 360, prompt tap 340, and a late tap 370. The taps represent a signal at different offsets, where the prompt tap represents the signal at a reference time, the early tap represents the signal prior to the reference time, and the late tap represents the signal after (or delayed relative to) the reference time. The carrier error and code error discriminators basically determine a relative delay between replica and incoming signals. The outputs of the carrier and code discriminators are used to update a tracking loop state vector. Code and carrier numerically controlled oscillators (NCOs) 380, 385 are used to generate code reference or replica signals (via replica code generator 390) and carrier reference or replica signals based on the tracking loop state vector to thereby maintain continuous tracking of received signal 305. The carrier replica signal is used to wipe-off 315 (or remove) the carrier from the received signal, and the code replica is used correlate against the received signal (or code) once the carrier signal has been wiped-off. However, the receiver does not wipe-off (or remove) the subcarrier signal prior to correlation. It is the presence of the subcarrier signal during the correlation function that results in the multi-peak autocorrelation function (ACF).

Various techniques may mitigate issues associated with the multi-peak binary offset carrier (BOC) autocorrelation function (ACF) and improve BOC tracking performance. One approach (referred to as "Bump Jump") makes use of additional correlators to confirm that the correct peak is tracked. False peak tracking is detected in this scheme, but only after it has already occurred and with some uncertainty. Another approach (referred to as Fante's method) to address the multi-peak issue requires 12 to 14 code taps at various delays to form a composite BOC ACF mimicking a traditional triangular shape.

In addition, double estimators enhance tracking by employing separate tracking loops and form independent delay estimates for the subcarrier and the code. Double estimator tracking architectures include: a double estimator with two-point discriminators (DE2); a double estimator with four-point discriminators (DE4); and a double phase estimator (DPE) where subcarrier reference signals are sine and cosine waves.

Figure 4:
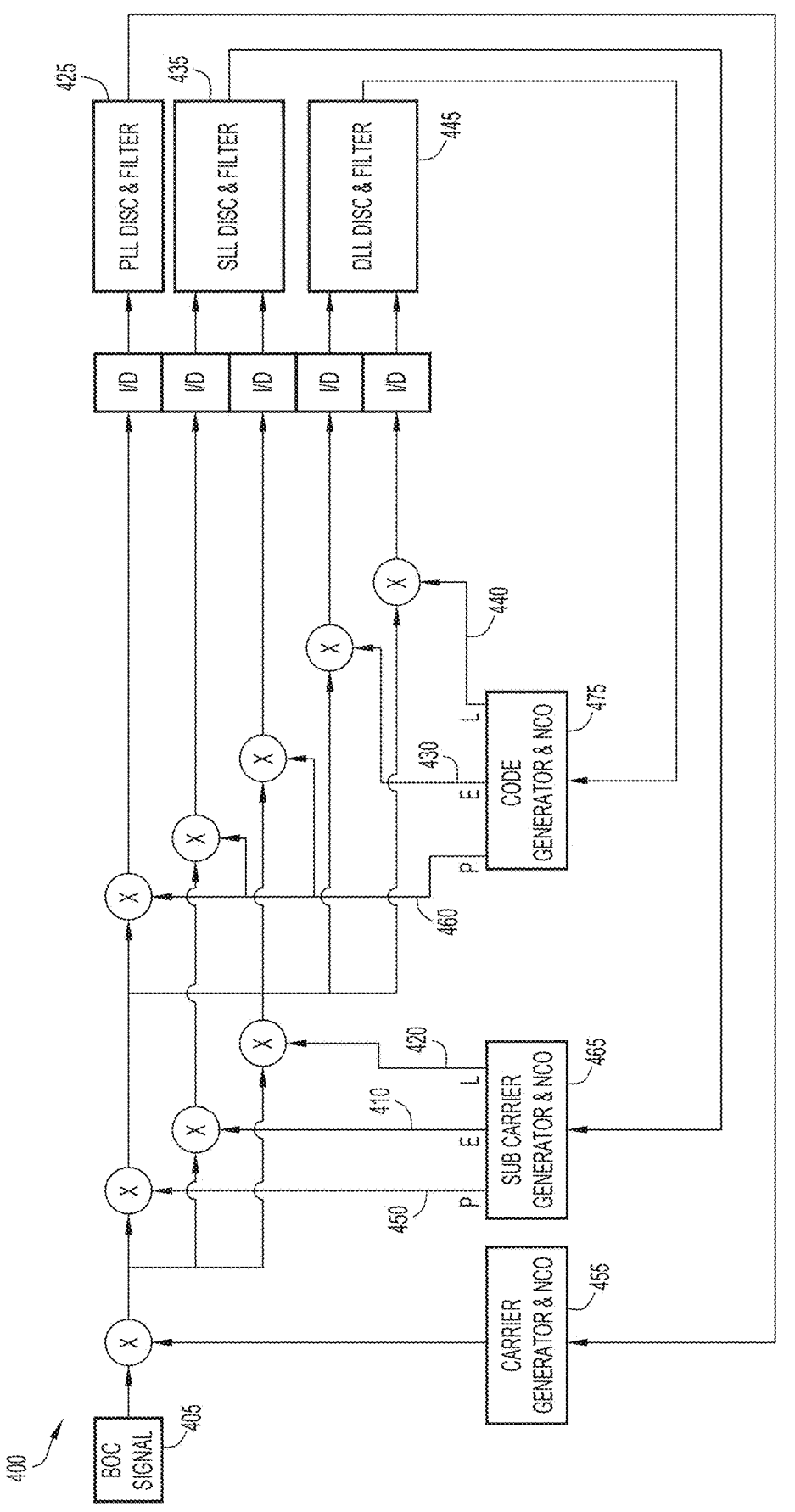
FIG. 4 is a block diagram of an example DE2 tracking architecture whose five correlator taps may be used by an embodiment of the present disclosure.

An example tracking architecture for a double estimator (DE) 400 is illustrated in FIG. 4. DE 400 receives a signal 405 (e.g., binary offset carrier (BOC) signal, etc.), and employs separate early (E) taps 410, 430 and late (L) taps 420, 440 in subcarrier and code, respectively. The taps represent a signal at different offsets, where the prompt tap represents the signal at a reference time, the early tap represents the signal prior to the reference time, and the late tap represents the signal after (or delayed relative to) the reference time. With prompt (P) taps 450, 460 for subcarrier and code, there are a total of five correlator tap outputs (from carrier discriminator 425 and carrier generator 455, subcarrier discriminator 435 and subcarrier generator 465, and code discriminator 445 and code generator 475) that are fed into a tracking channel. For example, the tap outputs may include: 1) a product of early subcarrier ($E_{Sc}$) tap 410 and prompt code ($P_{Cd}$) tap 460 ($E_{Sc}P_{Cd}$); 2) a product of late subcarrier ($L_{Sc}$) tap 420 and prompt code ($P_{Cd}$) tap 460 ($L_{Sc}P_{Cd}$); 3) a product of prompt subcarrier ($P_{Sc}$) tap 450 and prompt code prompt code ($P_{Cd}$) tap 460 ($P_{Sc}P_{Cd}$); 4) a product of prompt subcarrier ($P_{Sc}$) tap 450 and early code ($E_{Cd}$) tap 430 ($P_{Sc}E_{Cd}$); and 5) a product of prompt subcarrier ($P_{Sc}$) tap 450 and late code ($L_{Cd}$) tap 440 ($P_{Sc}L_{Cd}$).

Double estimator (DE) 400 may be implemented in hardware and/or software running on a general-purpose processor, such as a CPU or GPU. The DE uses the five-tap data to separately estimate subcarrier and code phases (e.g., or delays, except for a double phase estimator (DPE) subcarrier phase which is not a delay). The carrier, subcarrier, and code discriminators basically determine the relative phases or delay between replica and incoming signals, and may utilize any conventional or other techniques. For example, carrier discriminator 425 may employ a phase-locked loop (PLL) (and filters) to produce an output indicating a relative phase or delay of the carrier signal. Subcarrier discriminator 435 may employ a subcarrier-locked loop (SLL) (and filters) (e.g., phase-locked loop (PLL), etc.) to produce an output indicating a relative phase or delay of the subcarrier signal. Code discriminator 445 may employ a delay-locked loop (DLL) (and filters) to produce an output indicating a phase or delay of the code. Numerically controlled oscillators (NCOs) of carrier generator 455, subcarrier generator 465, and code generator 475 are used to generate reference or replica signals for the tracking channel based on the outputs of carrier discriminator 425, subcarrier discriminator 435, and code discriminator 445 to continuously track received signal 405.

Figures 5A, 5B:
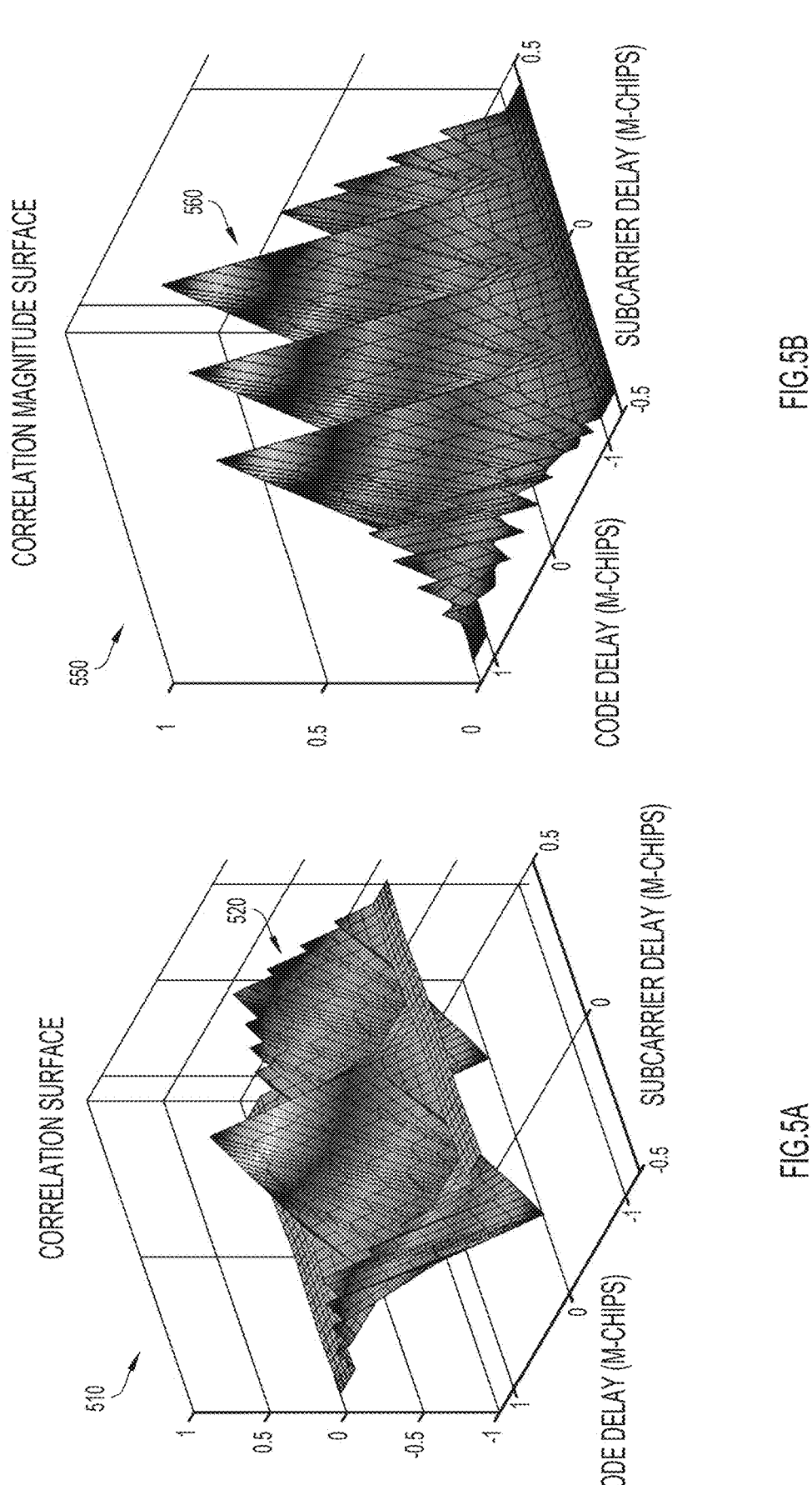
FIGS. 5A-5B are graphical plots of an autocorrelation surface and a correlation magnitude surface of an example signal that may be used by an embodiment of the present disclosure.

FIGS. 5A and 5B illustrate graphical plots of an autocorrelation surface and a correlation magnitude surface of an example signal (e.g., M-code signal, etc.). Plot 510 (FIG. 5A) represents a two-dimensional (2D) autocorrelation surface 520 of the example M-code signal. Plot 550 (FIG. 5B) represents the autocorrelation magnitude 560 of the example M-code signal (e.g., converting negative values of the autocorrelation surface (FIG. 5A) to positive values). The axes of plots 510, 550 include the subcarrier delay (or phase or error), the code delay (or phase or error), and the correlation value. The origin (e.g., XY-plane (subcarrier/code) origin, denoted as [0, 0] in plots 510, 550) represent true subcarrier and code phases or delays.

Figures 6A, 6B:
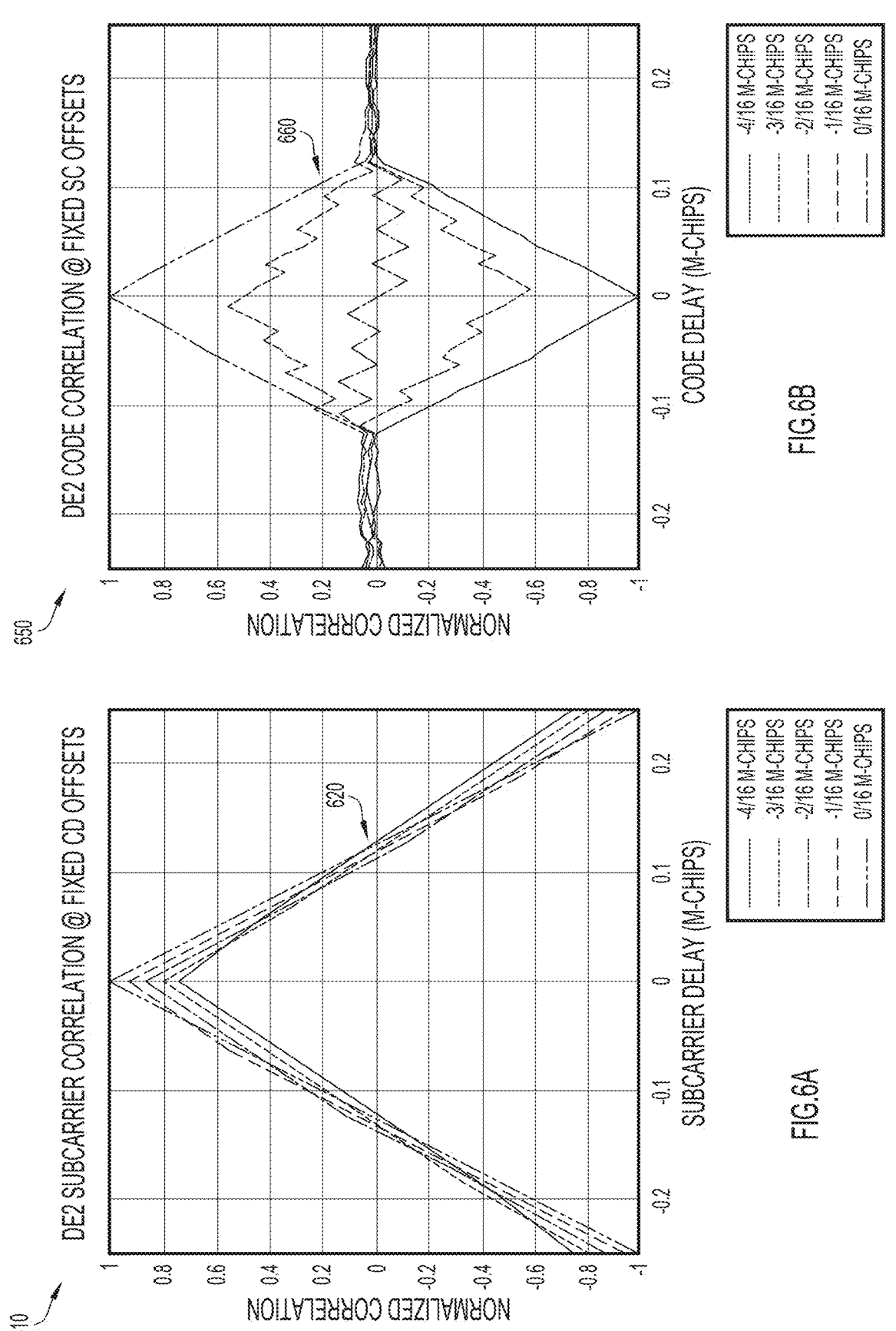
FIGS. 6A-6B are graphical plots of a one-dimensional (1D) slicing of the autocorrelation surface (of FIGS. 5A-5B) along subcarrier and code dimensions with a series of offsets in other dimensions that may be used by an embodiment of the present disclosure.

FIGS. 6A and 6B illustrate a one-dimensional (1D) slicing of the autocorrelation surface (of FIG. 5A) along subcarrier and code dimensions with a series of offsets in other dimensions. Plot 610 (FIG. 6A) represents a one-dimensional slicing 620 of the autocorrelation surface for the subcarrier with axes for subcarrier delay and the normalized correlation value. Each curve of plot 610 represents a one-dimensional (1D) slicing of the autocorrelation surface for the subcarrier at a different code offset (or code delay). Plot 650 (FIG. 6B) represents the one-dimensional slicing 660 of the autocorrelation surface for the code with axes for code delay and the normalized correlation value. Each curve of plot 650 represents a one-dimensional (1D) slicing of the autocorrelation surface for the code at a different subcarrier offset (or subcarrier delay). Plots 610, 650 include effects of thermal noise (and phase differences). The subcarrier correlation curve is about eight times narrower (e.g., between a range of normalized correlation magnitudes of 1 to 0) than the code correlation curve. Tracking code phase to the subcarrier correlation curve offers up to eight times better ranging accuracy (e.g., smaller code noise). The plots may be generated by measuring a corresponding subcarrier and code curve (e.g., curves with zero offset) and deriving the curves for the other offsets based on conventional or other mathematical techniques.

The autocorrelation surface and the corresponding (one-dimensional) slicing show a complex correlation structure and strong coupling between two dimensions (subcarrier and code). The coupling in the direction of subcarrier-to-code is particularly strong as evidenced by the dramatic change of shape in the code autocorrelation curve as subcarrier delay varies as shown in plot 650 (FIG. 6B).

Binary offset carrier (BOC) signal correlation characteristics show that BOC tracking is an intrinsically two-dimensional (2D) mathematical problem, which is mathematically inseparable. A separable N-dimensional mathematical problem is one whose characteristics are pairwise independent in all the dimensions. Thus, this type of problem can be simplified or decomposed into N easier-to-solve one-dimensional (1D) sub-problems. Correlation characteristics show BOC tracking is strongly inseparable and cannot be decomposed into two one-dimensional (1D) sub-problems. However, conventional double estimators (DEs) separately estimate subcarrier and code phases or delays which effectively decomposes the BOC tracking problem into two one-dimensional (1D) sub-problems. Accordingly, the DEs are built on a weak mathematical foundation. Further, since the DEs inherently treat the BOC tracking problem as a separable one, they ignore the strong coupling between the two dimensions (e.g., subcarrier and code) and represent a poor approximation to the actual problem.

Conventional tracking architecture for double estimators with four point discriminators (DE4) uses similar tracking correlator design as double estimators with two point discriminators (DE2) described above, but with the following correlation taps: 1) product of an early subcarrier ($E_{Sc}$) tap and an early code ($E_{Cd}$) tap ($E_{Sc}E_{Cd}$); 2) a product of a late subcarrier ($L_{Sc}$) tap and an early code ($E_{Cd}$) tap ($L_{Sc}E_{Cd}$); 3) a product of a prompt subcarrier ($P_{Sc}$) tap and a prompt code ($P_{Cd}$) tap ($P_{Sc}P_{Cd}$); 4) a product of an early subcarrier ($E_{Sc}$) tap and a late code ($L_{Cd}$) tap ($E_{Sc}L_{Cd}$); and 5) a product of a late subcarrier ($L_{Sc}$) tap and a late code ($L_{Cd}$) tap ($L_{Sc}L_{Cd}$). These taps are used to separately estimate subcarrier and code delays by using two four-point discriminators (instead of two-point discriminators as in DE2).

A conventional double phase estimator (DPE) uses the same taps in the code dimension but performs subcarrier wipe-off (or removal) with a sine and cosine modulated subcarrier. The correlator tap data is used to separately estimate subcarrier phase and code delay. In addition, DPE subcarrier wipe-off effectively limits the binary offset carrier (BOC) signal spectrum (hence reducing signal bandwidth) down to two sidebands flanking a carrier frequency. For example, when an M-code signal is under blue force electronic attack (BFEA) and with BFEA filtering to reduce the jamming effect, the signal spectrum is limited down to two sidebands. While DPE subcarrier wipe-off does not negatively impact tracking when the BOC signal is under band-limiting conditions (e.g., such as an M-code signal under BFEA jamming and filtering), it does reduce signal-to-noise ratio in a tracking channel that processes the full broadcast bandwidth of the M-code signal.

Accordingly, a present embodiment provides post-acquisition code and subcarrier phase pull-in and tracking of global navigation satellite system (GNSS) signals (e.g., binary offset carrier (BOC) signals, etc.) to provide for GNSS-based positioning, navigation, and timing applications, robust performance against high jamming, and support for high integrity navigation including high integrity real-time kinematic (RTK) applications.

In an embodiment, a situation-aware two-dimensional (2D) routing algorithm that accounts for the complex 2D autocorrelation surface is used post-acquisition to provide fast convergence to stable tracking, and tracks code and subcarrier phases to code and subcarrier correlation curves, respectively (with or without smoothing).

In an embodiment, a situation-aware two-dimensional (2D) routing algorithm that accounts for the complex 2D autocorrelation surface is used post-acquisition to provide fast convergence to stable tracking, followed by subcarrier phase ambiguity resolution (SCPAR) and tracking both subcarrier and code phases more accurately to a subcarrier correlation curve (with or without smoothing).

In an embodiment, a situation-aware two-dimensional (2D) routing algorithm that accounts for the complex 2D autocorrelation surface is used post-acquisition to provide fast convergence to stable tracking, followed by subcarrier phase ambiguity resolution (SCPAR) with high reliability assurance for correct peak tracking (such as five 9's (or 99.999%)). After subcarrier phase ambiguity resolution, subcarrier and code phases are tracked more accurately to a subcarrier correlation curve (with or without smoothing) to support high integrity navigation including high integrity real-time kinematic (RTK) applications.

In an embodiment, a situation-aware two-dimensional (2D) routing algorithm that accounts for the complex 2D autocorrelation surface is used post-acquisition to provide fast convergence to stable tracking, followed by subcarrier phase ambiguity resolution (SCPAR) with high reliability assurance for correct peaking tracking (such as five 9's (99.999%)), tracking subcarrier and code phases more accurately to a subcarrier correlation curve (with or without smoothing), and outputting channel time and ranging measurements to support high integrity navigation including high integrity real-time kinematic (RTK) applications.

In an embodiment, a situation-aware two-dimensional (2D) routing algorithm that accounts for the complex 2D autocorrelation surface is used post-acquisition to provide fast convergence to stable tracking, concurrent tracking to subcarrier and code correlation curves with smoothing for subcarrier and code phases, respectively, and upon reaching steady-state phase bias estimation, computing of phase bias by taking an average in time of the difference between code and subcarrier phases.

An embodiment provides post-acquisition code and subcarrier phase pull-in and tracking of global navigation satellite system (GNSS) signals (e.g., binary offset carrier (BOC) signals, etc.) to provide for GNSS-based positioning, navigation, and timing applications, robust performance against high jamming, and support for high integrity navigation including high integrity real-time kinematic (RTK) applications. An embodiment provides a situation-aware two-dimensional (2D) routing algorithm that is used post-acquisition to provide fast convergence to stable tracking by iteration of: determining which region a current 2D phase error resides using 2D correlation data; using this regional information with the 2D correlation data to calculate a situation-aware routing step vector (RSV); updating subcarrier and code phase numerically controlled oscillators (NCOs) in accordance with the RSV; and exiting iteration upon reaching stable tracking.

> An embodiment provides an estimated code and subcarrier phase bias resulting from a binary offset carrier (BOC) signal undergoing a dispersive analog and digital signal processing front end. The phase bias may be expressed as an average in time of:
> Code_Phase-Subcarrier_Phase, which depends on ionospheric delay and signal processing front end configuration. The subcarrier phase (Subcarrier_

Phase) can be measured or estimated by convergent tracking running in a phase bias estimation mode and saving the measurements as entries of a look-up table indexed by a front-end configuration. Ionosphere is also dispersive and contributes to additional phase bias. This part of phase bias can be dynamically computed with dual/triple-frequency measurements of ionospheric delay and can be used to dynamically compensate for the code phase (Code_Phase) since an ionospheric decorrelation time constant is much longer than tracking response time.

In an embodiment, a receiver is configured for receiving a global navigation satellite system (GNSS) signal comprising a carrier modulated by a code modulation function of a given code rate and further modulated by a subcarrier modulation function. The receiver comprises a reference code signal generator arranged to generate a reference code signal, a reference subcarrier signal generator arranged to generate a reference subcarrier signal, and a processor or hardware accelerator. The processor is arranged to use a situation-aware two-dimensional (2D) routing algorithm to converge to stable tracking that comprises determining a region in which a current 2D phase error resides using 2D correlation data by selecting an in-phase (I) or quadrature (Q) component of a subcarrier tap triplet (e.g., {a product of early subcarrier and prompt code ($E_{Sc}P_{Cd}$), a product of late subcarrier and prompt code ($L_{Sc}P_{Cd}$), a product of prompt subcarrier and prompt code ($P_{Sc}P_{Cd}$)}) in accordance with a larger magnitude of the product of the prompt subcarrier and prompt code ($P_{Sc}P_{Cd}$) I or Q component. When the selected I or Q component of the tap triplet all have the same signs (e.g., all positive or negative values), the phase error is in a candidate stable tracking region. Otherwise, the phase error is not in a candidate stable tracking region.

The two-dimensional (2D) routing algorithm further comprises using the regional information with the 2D correlation data to calculate a situation-aware routing step vector (RSV). This comprises calculating a subcarrier phase component of RSV (RSV_subcarrier) and a code phase component (RSV_code). When the phase error resides in a candidate stable tracking region, RSV_subcarrier is estimated (based on a corresponding subcarrier discriminator). Otherwise, subcarrier phase pull-in is performed with calculations derived in accordance with nearly linear nature of a subcarrier correlation curve. When the phase error resides in a candidate stable tracking region, RSV_code is estimated (based on a corresponding code discriminator) or set to zero pending a threshold test. Otherwise, code phase pull-in is performed using a code correlation curve. When RSV_code is estimated, RSV_code is further bias-compensated using the RSV_subcarrier. When a threshold number of consecutive estimated RSV_code has been obtained, a stable tracking condition is declared.

The two-dimensional (2D) routing algorithm further updates subcarrier and code phase numerically controlled oscillators (NCOs) in accordance with the routing step vector (RSV) and exits iteration upon reaching stable tracking.

Figure 12:
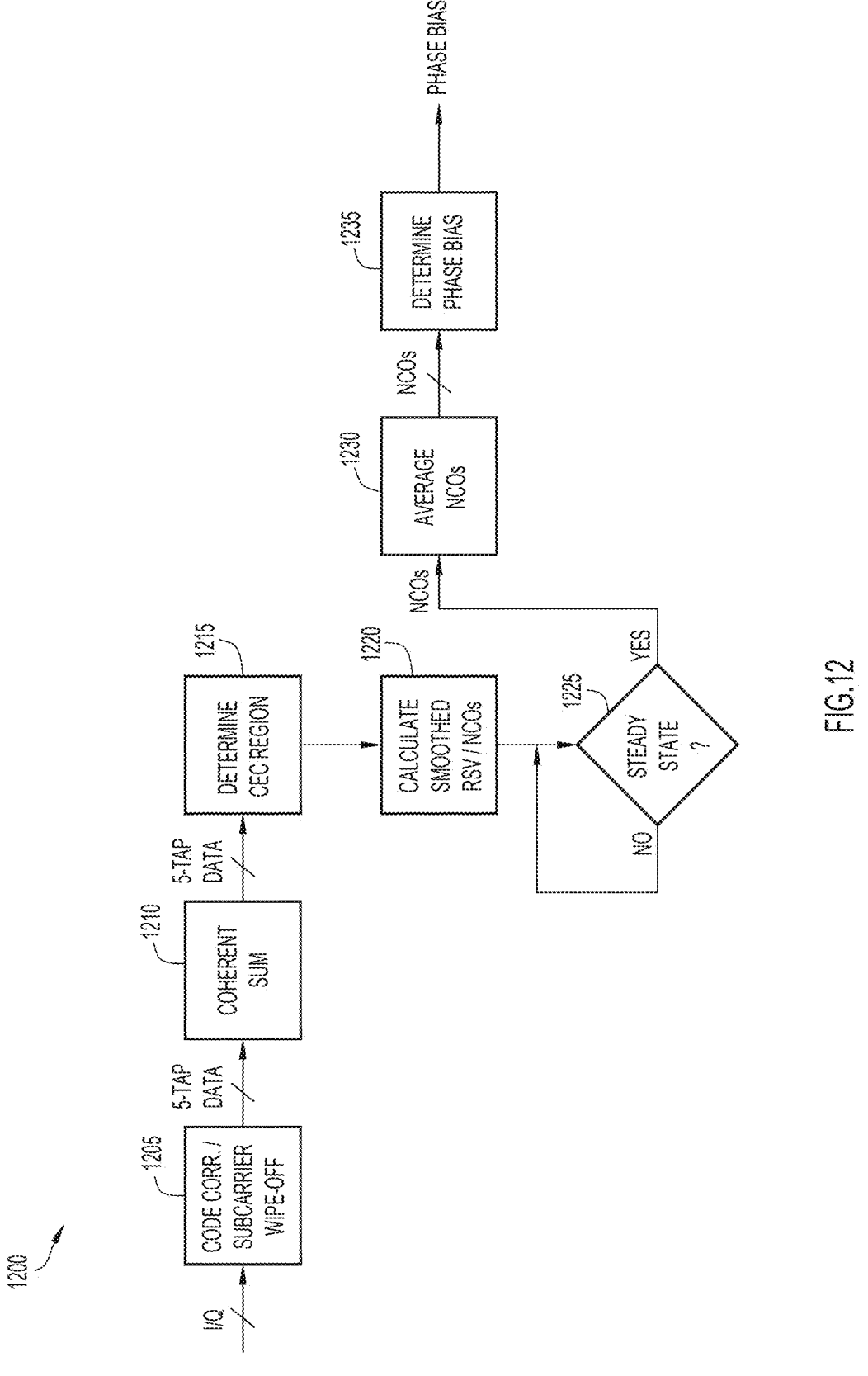
FIG. 12 is a flow diagram of a method for performing phase bias estimation according to an embodiment of the present disclosure.

The processor may further perform subcarrier phase ambiguity resolution (SCPAR) by comparing estimated code phase to subcarrier phase (e.g., with or without a half-chip adjustment). The processor may track code and subcarrier phases more accurately to a subcarrier correlation curve (with or without smoothing) by setting a code phase estimate as follows:

$$Code\_Phase\_Estimate = Code\_Phase\_Integer\_Chips + Subcarrier\_Phase\_Fractional\_Chips + Phase\_Bias,$$

where Code_Phase_Integer_Chips is the whole integer part of the code phase in subcarrier chips, Subcarrier_Phase_Fractional_Chips is the estimated fractional part of the subcarrier phase (typically smoothed), and Phase_Bias is determined as described below (FIG. 12). For example, the subcarrier and code phase may include an integer part and a fractional part. The integer part represents a quantity of full phase units, while the fractional part represents less than a full unit (e.g., with respect to a value of 1.5, 1 represents the integer part and 0.5 represents the fractional part). After summation, the code phase estimate is preferably scaled into units of code chips. Since this formulation only depends on the fractional part of subcarrier phase, cycle slip in a subcarrier phase is a non-issue due to periodicity in subcarrier modulation. The processor outputs channel time and ranging measurements.

This provides post-acquisition fast convergence to stable tracking and accurate tracking that supports high integrity navigation including high integrity real-time kinematic (RTK) applications.

In an embodiment, a receiver is configured for receiving a global navigation satellite system (GNSS) signal comprising a carrier modulated by a code modulation function of a given code rate and further modulated by a subcarrier modulation function. The receiver comprises a reference code signal generator arranged to generate a reference code signal, a reference subcarrier signal generator arranged to generate a reference subcarrier signal, and a processor or hardware accelerator. The processor is arranged to use a situation-aware two-dimensional (2D) routing algorithm to converge to stable tracking, concurrently track code and subcarrier phase to their respective correlation curves with smoothing, compute phase bias by taking average in time of the difference between code and subcarrier phase estimates, and output phase bias. This provides phase bias estimation capability.

As discussed above, double estimator (DE) based tracking, by performing independent estimation of subcarrier and code phases, inherently assumes the binary offset carrier (BOC) tracking problem is mathematically separable. Since this is contrary to BOC signal 2D correlation characteristics, the DE type of tracking is built upon a weak mathematical foundation and provides a poor approximation.

Convergent tracking according to a present embodiment is a true two-dimensional (2D) binary offset carrier (BOC) tracking technique that accounts for a complex 2D autocorrelation surface and, hence, properly treats BOC tracking as an inseparable or intrinsically 2D problem as required. This type of tracking provides several advantages. For example, the convergent tracking may use existing tracking channel hardware (with new or modified tracking channel software) and correlator taps (e.g., existing double estimator (DE2) correlator taps for all jamming conditions, existing double phase estimator (DPE) correlator taps for jamming a BOC signal that reduces it to two sidebands flanking a carrier frequency, etc.). Further, the convergent tracking converges to stable tracking quickly post-acquisition (provides self-pull-in), tracks a BOC signal robustly upon convergence, meets state 5 and state 3 high jamming requirements, achieves better tracking accuracy, tracks to a correct correlation peak with a high degree of assurance under state 5 (which supports a high assurance level, such as five 9's reliability (or 99.999%)), and supports high integrity navigation under state 5 (which includes high integrity real-time kinematic (RTK) applications).

Figure 7:
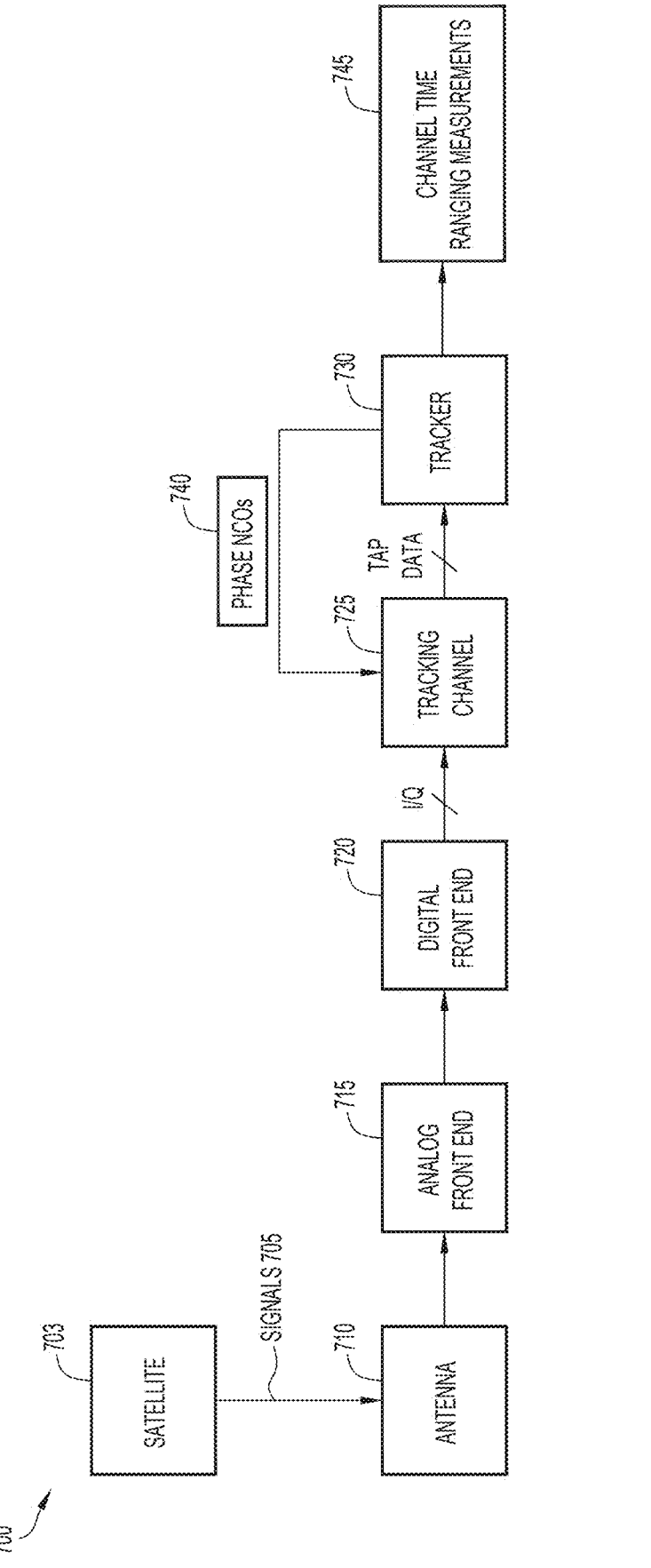
FIG. 7 is a block diagram of a receiver with convergent tracking according to an embodiment of the present disclosure.
Figure 8:
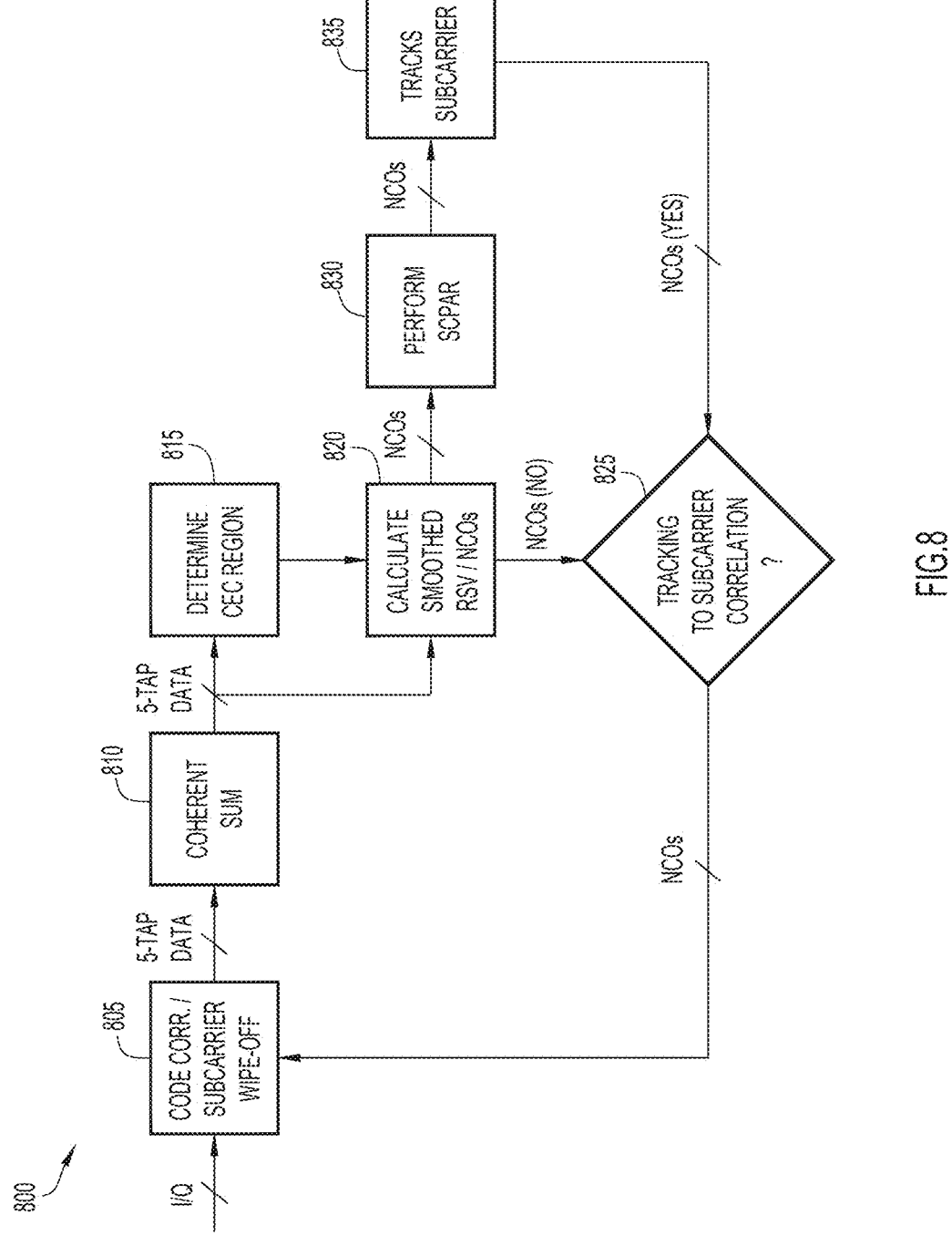
FIG. 8 is a flow diagram of a method for convergent tracking according to an embodiment of the present disclosure.
Figure 9:
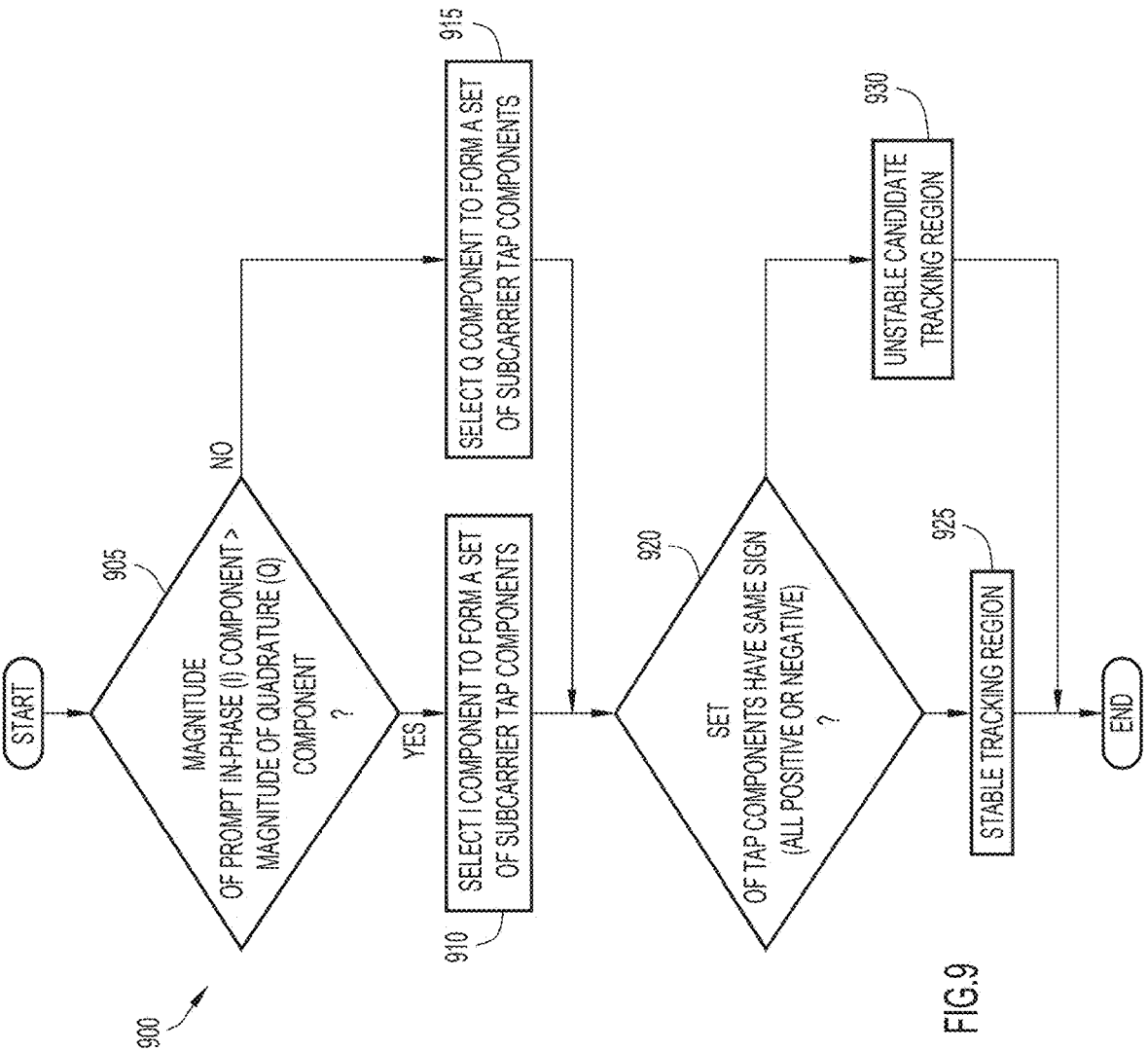
FIG. 9 is a flowchart of a method for determining a region for phase error coordinates according to an embodiment of the present disclosure.
Figure 10:
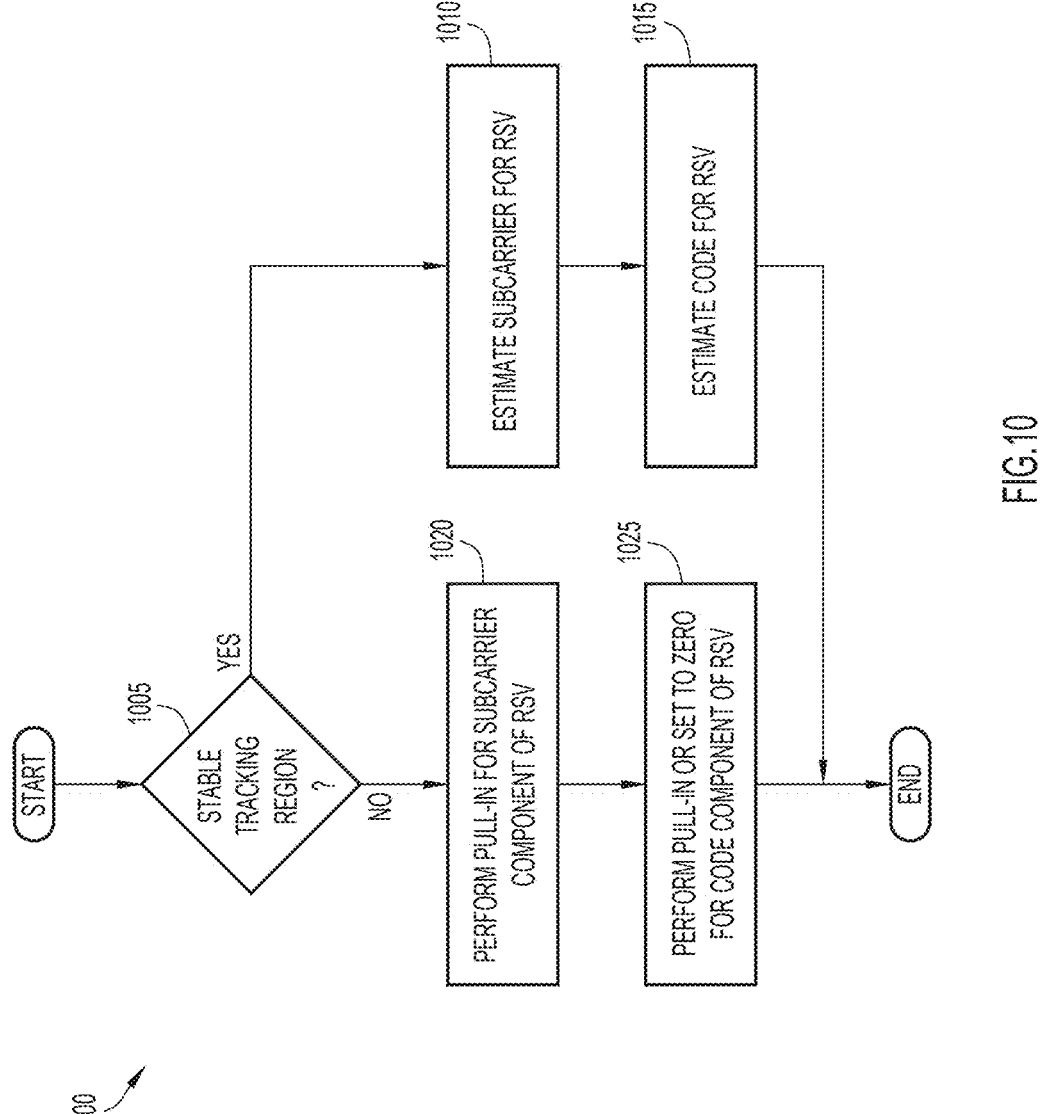
FIG. 10 is a flowchart of a method for determining a routing step vector (RSV) based on region information and correlation tap data according to an embodiment of the present disclosure.

FIG. 7 is a block diagram of a receiver 700 with convergent tracking according to an embodiment of the present disclosure. Receiver 700 includes an antenna 710, an analog front end 715, a digital front end 720, a tracking channel 725, a tracker 730, and numerically controlled oscillators (NCOs) 740. Initially, antenna 710 receives signals 705. The signals may be from a satellite 703 of a global navigation satellite system (GNSS) and include binary offset carrier (BOC) signals, where antenna 710 is configured to receive these types of signals. Analog front end 715 performs analog conditioning including converting the received signal to baseband (or near baseband) and performing analog filtering. These may include any conventional or other techniques.

Digital front end 720 reduces residual intermediate frequency (IF) elements in the signals from the analog downconversion of analog front end 715, and performs additional filtering of these signals to produce in-phase (I) and quadrature (Q) components (that maintain phase and magnitude information). This may include any conventional or other techniques.

Tracking channel 725 performs carrier and subcarrier wipe-off (or removal) and correlation (between actual and replica codes and signals) based on the in-phase (I) and quadrature (Q) components as described herein. The correlation basically de-spreads the signals. For example, the signals include a carrier signal modulated to spread information across a spectrum (e.g., as described above for a binary offset carrier (BOC) signal). The information of the signals is de-spreaded, where a carrier signal and subcarrier signal are wiped-off (or removed) to provide a baseband signal (or code). A replica code is generated to correlate with the code of the incoming signal for tracking.

Tracker 730 adjusts or steers numerically controlled oscillators (NCOs) 740 based on results (or observables) of the correlation (according to techniques described herein) to produce replica signals and codes close (or aligned) to the received signals. The tracker maintains the placement of the replica signals and codes as a function of time to obtain time and ranging measurements. The replica signals and codes are used for correlation with (or to track) received signals.

Channel time ranging measurements 745 are produced and may be used for various navigation or other applications. The channel time measurements are based on where the replica signals and/or codes (e.g., aligned with the received signals) are placed as a function of time (which may be derived based on a comparison of a time of transmission to a receiver time). An embodiment may employ the architecture of FIG. 4 whose operation is modified (e.g., via software, hardware, etc.) to perform the functions of tracking channel 725, tracker 730, and NCOs 740.

With continued reference to FIGS. 4-7, FIG. 8 is a flow diagram of a method 800 for tracking signals according to an embodiment of the present disclosure. This may correspond to tracking channel 725, tracker 730, and NCOs 740 of FIG. 7. Initially, in-phase (I) and quadrature (Q) signal components are received from digital front end 720. Code correlation and carrier (and subcarrier) wipe-off are performed at operation 805 in substantially the same manner described above, and tap data is produced. For example, the tap data may include a product of an early subcarrier ($E_{Sc}$) tap and a prompt code ($P_{Cd}$) tap ($E_{Sc}P_{Cd}$), a product of a late subcarrier ($L_{Sc}$) tap and a prompt code ($P_{Cd}$) tap ($L_{Sc}P_{Cd}$), a product of a prompt subcarrier ($P_{Sc}$) tap and a prompt code ($P_{Cd}$) tap ($P_{Sc}P_{Cd}$), a product of a prompt subcarrier ($P_{Sc}$) tap and early code ($E_{Cd}$) tap ($P_{Sc}E_{Cd}$), and a product of a prompt subcarrier ($P_{Sc}$) tap and a late code ($L_{Cd}$) tap ($P_{Sc}L_{Cd}$) as described above.

A coherent sum is produced for the tap data at operation 810, and the resulting tap data is used to determine a region of phase error coordinates (e.g., the phase error coordinates residing within a stable tracking region) within the autocorrelation surface (FIGS. 5A-5B and 6A-6B) at operation 815. A routing step vector (RSV) is determined at operation 820 based on the region of the phase error coordinates. The RSV includes information (e.g., a subcarrier phase (RSV_subcarrier) component and a code phase (RSV_code) component) to control or adjust numerically controlled oscillators (NCOs) to produce replica signals and codes for tracking. When the phase error coordinates reside in a stable tracking region, the subcarrier and code phases are estimated (based on corresponding subcarrier and code discriminators) as described below. However, when the phase error coordinates do not reside in a stable tracking region, the subcarrier and code phases are determined based on correlation curves as described below.

The routing step vector (RSV) is converted into controls (e.g., phase control words (PCW)) for subcarrier and code phase numerically controlled oscillators (NCOs) at operation 820. This may be accomplished via any conventional or other techniques. For example, this may be accomplished via a modulo operation (to obtain fractional phases) and quantization in accordance with several quantization bits used for the phase control words (PCWs). When code phase is tracked to a code correlation curve (as opposed to a subcarrier correlation curve) as determined at operation 825, the tracking channel is updated with the computed subcarrier and phase NCOs. Each update constitutes one cycle for the tracking convergence process. Iteration of the process may repeat from operation 805 until a threshold number of consecutive estimated code phase (RSV_code) components of the routing step vector (RSV) has been obtained (e.g., indicating that the phase error coordinates remained in a stable tracking region). Thus, the two-dimensional (2D) routing process converges to a stable tracking region. In other words, the tracking is near a peak of the autocorrelation function (ACF).

Tracking to the subcarrier correlation curve may be employed for greater accuracy (e.g., when near a peak of the autocorrelation function (ACF)). When tracking to subcarrier correlation is employed as determined at operation 825, subcarrier phase ambiguity resolution (SCPAR) and subcarrier tracking are performed at operations 830, 835. When higher ranging accuracy (e.g., lower code noise) is desired, instead of tracking code phase to a coarser code correlation curve as described above, an embodiment may perform subcarrier phase ambiguity resolution (SCPAR) with a-priori knowledge of phase bias and track both subcarrier and code phases more accurately to a subcarrier correlation curve. A prior determination of code and subcarrier phase bias may be performed as described below (FIG. 12).

The subcarrier phase ambiguity resolution (SCPAR) is performed at operation 830 by comparing estimated code phase to subcarrier phase (with or without a half-chip adjustment). For example, tracking may correspond to a code correlation curve with a negative correlation (e.g., bottommost curve of FIG. 6B). In this case, the subcarrier phase may be adjusted (e.g., by a half-chip) to shift tracking to the corresponding curve with positive correlation (e.g., switch from a bottommost curve to the topmost curve of FIG. 6B). By way of example, since the subcarrier width may be half the code width (FIG. 1B), the subcarrier phase has information to a finer granularity. The estimated code phase and subcarrier phase, upon reaching stable tracking region, may be obtained from corresponding discriminators as described above. The comparison determines a difference between the estimated code phase and subcarrier phase (with or without a half-chip adjustment) to determine a fractional part of the subcarrier phase (beyond half-chip boundaries) to use to adjust the code phase estimate. The tracking to the subcarrier correlation curve may be accomplished by using the estimated, more accurate fractional subcarrier phase to fine-adjust the estimated, coarser fractional code phase to improve the code phase accuracy. During the process, some bookkeeping is carried out to ensure the whole code phase state is correctly maintained.

When the tracking is designed to support high integrity navigation including high integrity real-time kinematic (RTK) applications, an integrity allocation should be levied during the subcarrier phase ambiguity resolution (SCPAR) process to ensure a high assurance level. An exemplary integrity allocation, calculation, and analysis scheme includes: (1) Perform a-priori Gaussian overbound for errors of smoothed subcarrier and code phase estimates upon reaching steady-state tracking condition for a given tracking state (e.g., State 5 tracking); (2) Allocate a small integrity budget, PIB1 (e.g., 1e-8 or 1 in 100,000,000), to bound subcarrier error to within (−ER1, +ER1) (this step takes advantage of subcarrier phase error typically being small enough and intentionally avoids performing a cumbersome double integral calculation involving convolution of subcarrier and code phase error distributions); (3) There are three mutually exclusive outcomes for a given SCPAR test where subcarrier phase error distributions, by virtue of spending the small integrity budget (PIB1), can now be treated as being confined to within one of the following three regions (in subcarrier chips):

$$(-ER1,+ER1)+n/2, \text{ where } n=-1,0,+1;$$

(4) Enforce in real time that SCPAR must pass an integrity test of the following for one of the three n=−1, 0, +1 values:

$$abs(\text{Delta\_Fractional\_Phase}+n/2)<ER2,$$

where: (i)
Delta_Fractional_Phase=Code_Fractional_Phase-Subcarrier_Fractional_Phase-Phase_Bias Modulo Subcarrier_Chip so that Delta_Fractional_Phase is within $[-\frac{1}{2}, +\frac{1}{2}]$ in subcarrier chips; and (ii) Subcarrier_Fractional_Phase is its pre-SCPAR value whose post-SCPAR counterpart may or may not include a potential half-chip adjustment depending on the passing n value; (5) The Probability of Incorrect Peak (i.e., resolving to an incorrect peak), PIP, is given by: PIP=max {PIP (n=−1), PIP (n=0), PIP (n=+1)}<PIB1+P {Code_Phase_Error>½-(ER1+ER2)}, where: the first term conservatively assumes whenever actual subcarrier phase error is outside the indicated three regions, resolving to an incorrect peak happens with certainty; and the second term is the one-sided probability, P, of code phase error being greater than the specified value; and (6) Choose ER2 value so that PIP is less than the desired integrity allocation (e.g., 1 in 100,000). Note that: (1) To account for residual phase bias error, one can accomplish that by slightly inflating the overbound sigma of code phase error (since residual phase bias error is typically much smaller than code phase error); and (2) The maximum ER2 value meeting the integrity allocation should be chosen to achieve maximum availability of passing high integrity SCPAR test.

After one or several consecutive successful SCPARs, tracking of both subcarrier and code phases are performed more accurately to a subcarrier correlation curve (instead of the code correlation curve) with bookkeeping to maintain the whole code phase state. Tracking code phase to a subcarrier correlation curve may be accomplished at operation 835 by setting a code phase estimate as follows:

Code Phase Estimate=Code_Phase_Integer_Chips+
Subcarrier_Phase_Fractional_Chips+Phase_Bias, where Code_Phase_Integer_Chips is the whole integer part of the code phase in subcarrier chips, Subcarrier_Phase_Fractional_Chips is the estimated fractional part of subcarrier phase, and the phase bias is determined as described below (FIG. 12). This improves the code phase accuracy by using the finer subcarrier fractional phase.

Numerically controlled oscillator (NCO) controls are produced from the subcarrier tracking (e.g., subcarrier phase estimate and code phase estimate) and provided to NCOs to produce the replica signals and code for tracking from operation 805 in substantially the same manner described above. Iteration of the process (with subcarrier phase ambiguity resolution (SCPAR)) may repeat from operation 805 until the phase error coordinates remain in a stable tracking region for a consecutive number of times, thereby indicating stable tracking.

Once in a stable tracking state (with or without SCPAR), channel time and ranging measurements may be provided for various applications (e.g., position, navigation, and timing applications, global navigation satellite system (GNSS) applications, etc.). The above processes are repeated to maintain tracking after reaching the stable tracking state.

With continued reference to FIGS. 4-8, FIG. 9 is a flowchart of a method 900 for determining a region within the autocorrelation surface (FIGS. 5A-5B and 6A-6B) for phase error coordinates according to an embodiment of the present disclosure. This may correspond to operation 815 of FIG. 8. Initially, two-dimensional (2D) current phase error coordinates (CEC) may be represented as:

CEC=: [subcarrier_phase_error, code_phase_error].

The subcarrier phase error (or delay) and code phase error (or delay) may be determined from correlation of the received signals in substantially the same manner described above. A region (e.g., stable tracking region, etc.) in which the phase error coordinates reside within the autocorrelation surface may be determined by initially comparing the magnitudes of in-phase (I) and quadrature (Q) components of a set of tap data at operation 905. The set of tap data may include a product of early subcarrier and prompt code, a product of late subcarrier and prompt code, and a product of prompt subcarrier and prompt code, $\{E_{Sc}P_{Ca}, L_{Sc}P_{Cd}, P_{Sc}P_{Ca}\}$. When the magnitude of the in-phase (I) component of the product of the prompt subcarrier and prompt code element ($P_{Sc}P_{Cd}$) of the set is greater than the magnitude of the corresponding quadrature (Q) component, the in-phase (I) component of the elements in the set are selected to form a set of tap components at operation 910. However, when the magnitude of the quadrature (Q) component of the product of the prompt subcarrier and prompt code element ($P_{Sc}P_{Cd}$) of the set is greater than the magnitude of the corresponding in-phase (I) component, the quadrature (Q) component of the elements in the set are selected to form the set of tap components at operation 915.

The set of tap components are analyzed at operation 920. When the set of tap components have the same sign (e.g., all positive values or all negative values), the phase error coordinates are indicated as residing in a candidate stable tracking region of the autocorrelation surface at operation 925. However, when the set of tap components do not have the same sign (i.e., mixed positive and negative values), the phase error coordinates are indicated as not residing in a candidate tracking region (or in an unstable tracking region) of the autocorrelation surface at operation 930.

With continued reference to FIGS. 4-9, FIG. 10 is a flowchart of a method 1000 for determining a routing step vector (RSV) based on region information according to an embodiment of the present disclosure. This may correspond to operation 820 of FIG. 8. Initially, the regional information (e.g., within a stable tracking region or within an unstable tracking region of the autocorrelation surface) is used in conjunction with two-dimensional (2D) correlation data (e.g., FIGS. 5A-5B and FIGS. 6A-6B) to compute a situation-aware routing step vector (RSV). The RSV may be defined as:

RSV=[RSV_subcarrier,RSV_code].

The RSV is the immediate next step vector (routing direction and step size) to take to route towards a stable tracking region.

When the region is a stable tracking region of the autocorrelation surface as determined at operation 1005, the subcarrier phase component (RSV_subcarrier) of the routing step vector (RSV) is estimated at operation 1010, e.g., by using an improved, near-bias-free early minus late (EML) type of estimation (i.e., (E−L)/(E+L)). This type of estimation becomes valid only within a stable tracking region.

When the region is a stable tracking region of the autocorrelation surface as determined at operation 1005, the code phase component (RSV_code) of the routing step vector (RSV) is estimated at operation 1015, e.g., by using an improved, near-bias-free EML type of estimation (i.e., (E−L)/(E+L)). This type of estimation becomes valid only within a stable tracking region.

When the code phase component (RSV_code) is estimated, the code phase component (RSV_code) is further bias-compensated with the subcarrier phase component (RSV_subcarrier). For example, the correlation curve peaks of FIG. 6B may be misaligned, and the code phase bias compensation reduces the misalignment in a near-error-free manner (i.e., the residual error post-bias adjustment is second order or much smaller to the adjustment itself). When a threshold number of consecutive estimated code phase components (RSV_code) has been obtained, a stable tracking condition is declared.

When the region is not a stable tracking region as determined at operation 1005 (e.g., along a curve of FIG. 6B with misalignment between the code and subcarrier (e.g., a curve corresponding to a non-zero offset of the subcarrier with multiple peaks)), subcarrier and code phase pull-ins are performed to steer tracking (so to shift tracking away from a poor code correlation curve (e.g., with multiple peaks) toward a more accurate (e.g., corresponding to near zero offset) code correlation curve). In other words, when in an unstable region where EML type of estimation is invalid, estimates from the subcarrier and code phase pull-ins are used instead to steer the tracking towards a stable tracking region. The subcarrier phase component (RSV_subcarrier) is determined at operation 1020 using a subcarrier phase pull-in with calculations derived in accordance with a subcarrier correlation curve (e.g., a curve of FIG. 6A which has near zero misalignment and close to linear in both slopes). The mathematical formula for subcarrier phase pull-in is a simple linear extrapolation to determine subcarrier phase error by noting that a subcarrier correlation curve is very close to being linear on either of its two slopes, and a linear approximation is nearly bias-free. A nearly bias-free estimation process is one that a bias error introduced by an estimation mechanism is second or higher order to (e.g., much smaller than) the error (in this case subcarrier phase error) being estimated.

To perform subcarrier phase pull-in, magnitudes of subcarrier Early and Late taps, denoted as s_emag and s_lmag, respectively, magnitude of Prompt tap, pmag, and subcarrier Early to Prompt tap spacing, Tsctap, are used. The subcarrier pull-in is carried out by performing the following calculations:

```
if (s_emag>s_lmag)
    smag=s_emag;
    RSV_subcarrier=+Tsctap;
else
    smag=s_lmag;
    RSV_subcarrier=-Tsctap;
end
ratio=min (pmag/smag, ⅔);
RSV_subcarrier=(2-ratio/(1-ratio))*RSV_subcarrier.
```

The code phase component (RSV_code) is determined at operation 1025 using a code phase pull-in with calculations derived in accordance with a code correlation curve when prompt magnitude is close to and just under the expected prompt magnitude as estimated by a scaled sum of early and late magnitudes (Note: The scaled sum of early and late magnitudes provides a more accurate estimate of peak correlation magnitude, where a simple linear scaling, $1/(2*(1-Tcdtap))$ accounts for a particular tap spacing choice and Tedtap is code early-to-prompt tap spacing.). If this condition is not met, no useful information can be derived for RSV_code at this iteration, and RSV_code is then set to zero. The mathematical formula for code phase pull-in is a simple linear extrapolation to determine code phase error based on code correlation curves. Magnitudes of code Early and Late taps, denoted as emag and lmag, respectively, magnitude of Prompt tap, pmag, code Early to Prompt tap spacing, Tedtap, a constant to limit magnitude of RSV_code, RSV_codeMax, and a scale factor, sf, that depends of type of BOC signal are used. The code pull-in is carried out by performing the following calculations:

```
sEL=emag+lmag;
dEL=emag-lmag;
if ((emag>pmag) && (pmag>lmag))
    RSV_code=1-pmag/(emag-pmag)*Tcdtap+RSV_sub-
        carrier;
    if (RSV_code<0)
        RSV_code=sf*dEL/sEL;
    elseif (RSV_code>+RSV_codeMax)
        RSV_code=+RSV_codeMax;
    end
elseif ((lmag>pmag) && (pmag>emag))
    RSV_code=pmag/(lmag-pmag)*Tcdtap-1+RSV_sub-
        carrier;
    if (RSV_code>0)
        RSV_code=sf*dEL/sEL;
    elseif (RSV_code<-RSV_codeMax)
        RSV_code=-RSV_codeMax;
    end
else
    RSV_code=0; % Set to zero when can't derive useful
        code info end
```

Figure 11B:
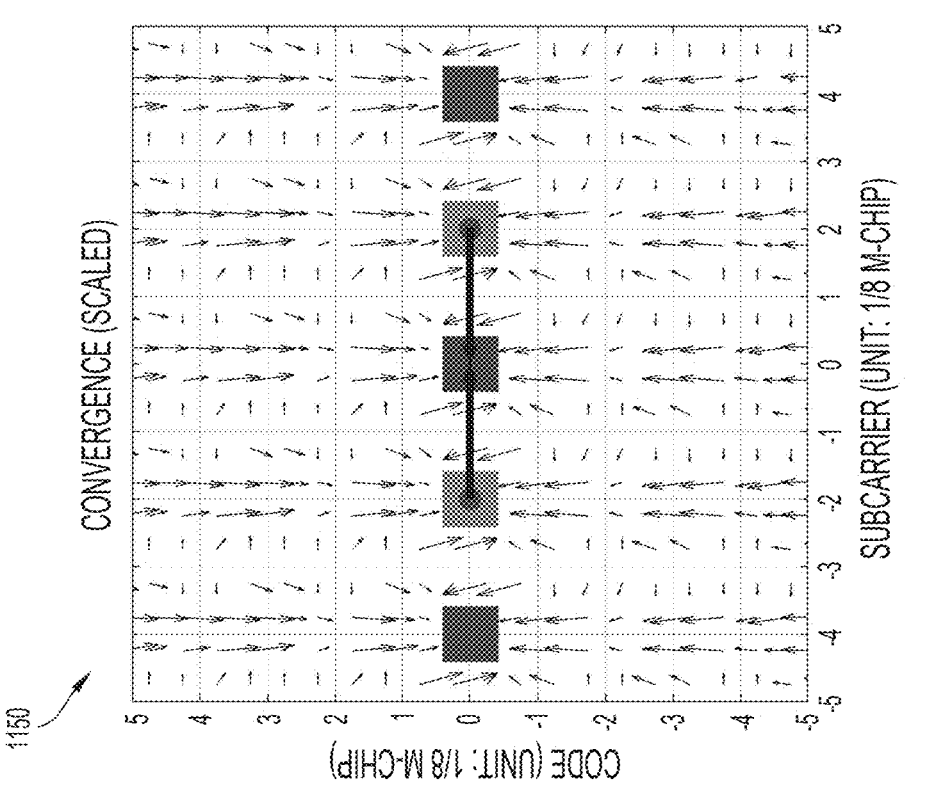
FIGS. 11A-11B are graphical plots of unscaled (drawn to scale to reflect relative arrow magnitudes) and scaled (reduced arrow lengths to show non-overlapping arrows for easier visualization) flow diagrams for convergent tracking according to an embodiment of the present disclosure.
Figure 11A:
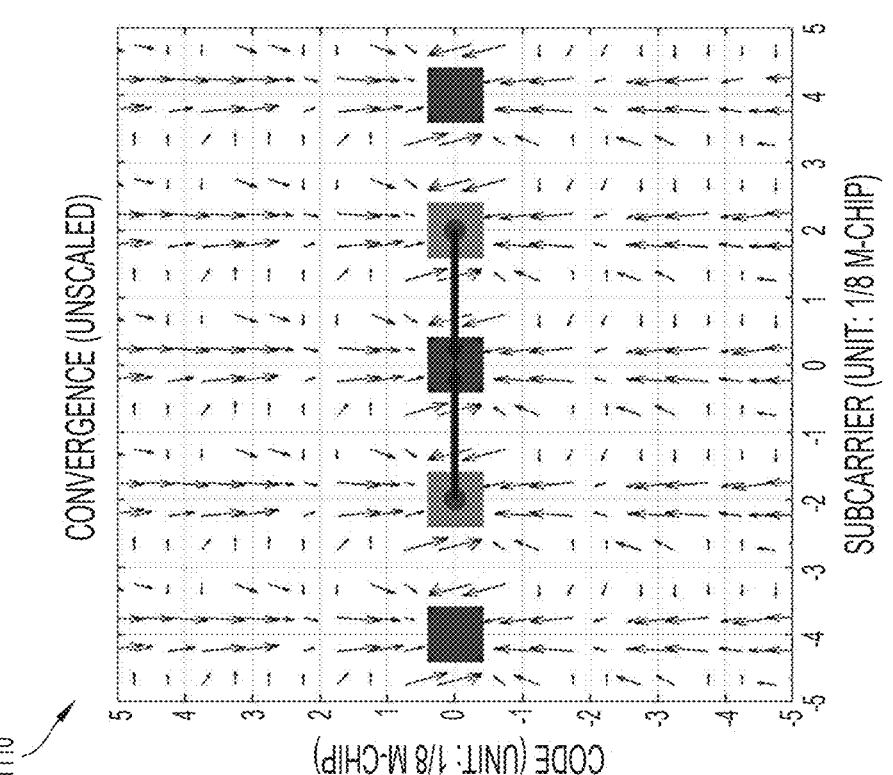

The tracking of present embodiments achieves a fast convergence with a large convergence radius. For example, with respect to an M-code signal, an embodiment converges on average in less than 3 subcarrier and code phase numerically controlled oscillator (NCO) update cycles and achieves a large ⅝ M-chip in radius of convergence (compared to a conventional double estimator (DE) radius of ⅛ M-chip)

based on Monte-Carlo simulations and flow diagram plots. FIGS. 11A-11B illustrate graphical plots 1110, 1150 of unscaled and scaled flow diagrams for tracking according to an embodiment of the present disclosure. Unscaled plot 1110 and scaled plot 1150 are drawn to scale (e.g., flow arrow lengths proportional to actual lengths) and scaled to avoid overlapping arrows (e.g., in this case, flow arrow lengths are reduced to avoid overlapping and to allow visualization of a clear flow pattern), respectively.

Discriminator is an applicable concept or useful metric for one-dimensional (1D) tracking (e.g., C/A-code, P/Y-code, and M-code Dual Side Band (DSB)), or one-dimensional (1D)-like tracking (e.g., double estimator (DE) approaches (akin to 1D plus 1D tracking)). However, it is not applicable to a true 2D binary offset carrier (BOC) tracking solution. A 2D flow diagram (e.g., FIGS. 11A and 11B depict the M-code case where subcarrier chip equaling half M-chip) is a proper metric for convergent 2D tracking solutions, such as those of the present embodiments. The outer and center square boxes indicate stable tracking regions around correct peaks (due to periodicity in subcarrier phase, any offsets in integer multiples of its periodicity, one subcarrier chip, are correct peaks in the present embodiment where subcarrier whole cycle slip is a non-issue), while the inner cyan boxes indicate peaks with half-chip offsets (incorrect peaks). The thicker arrows between the boxes indicate (e.g., half-chip) subcarrier phase ambiguity resolution (SCPAR).

Unscaled plot 1110 shows fast convergence, while scaled plot 1150 shows robust convergence of initial (post-acquisition) code phase error with a large radius of convergence, which is more than enough to meet the typical tracking needs. Upon convergence, an embodiment can track code and subcarrier phases to their respective correlation curves usually with some form of smoothing on the phase estimates. The subcarrier and code phase smoothing may employ any conventional or other techniques.

An embodiment provides an estimated code and subcarrier phase bias resulting from a binary offset carrier (BOC) signal undergoing a dispersive analog and digital signal processing front end. The phase bias may be expressed as an average in time of steady-state estimates of:

Code_Phase-Subcarrier_Phase, which depends on ionospheric delay and signal processing front end configuration. The subcarrier phase (Subcarrier_Phase) can be measured or estimated by the tracking running in a phase bias estimation mode and saving the measurements as entries of a look-up table indexed by a front end configuration. The code phase (Code_Phase) can be dynamically compensated with dual/triple-frequency measurements of ionospheric delay (whose dispersive contribute to phase bias can be analytically calculated) since an ionospheric decorrelation time constant is much longer than tracking response time.

With continued reference to FIGS. 4-10, FIG. 12 is a flow diagram of a method 1200 for phase bias estimation according to an embodiment of the present disclosure. This may be performed in response to selection of a phase bias estimation mode (e.g., by a user, based on occurrence of certain conditions, upon initialization, etc.), and may also be performed for a tracking mode without prior knowledge of phase bias. The phase bias estimation of method 1200 uses a 2D routing algorithm to converge to stable tracking as described above (FIGS. 8-10), and concurrently tracks code and subcarrier phases to their respective correlation curve typically with smoothing. A post-run computation of phase bias may be performed before phase bias is output for subsequent tracking.

Initially, in-phase (I) and quadrature (Q) signal components are received from digital front end 720. Code correlation and carrier and subcarrier wipe-off are performed at operation 1205 in substantially the same manner described above, and tap data is produced. For example, the tap data may include a product of an early subcarrier ($E_{Sc}$) tap and a prompt code ($P_{Cd}$) tap ($E_{Sc}P_{Cd}$), a product of a late subcarrier ($L_{Sc}$) tap and a prompt code ($P_{Cd}$) tap ($L_{Sc}P_{Cd}$), a product of a prompt subcarrier ($P_{Sc}$) tap and a prompt code ($P_{Cd}$) tap ($P_{Sc}P_{Cd}$), a product of a prompt subcarrier ($P_{Sc}$) tap and early code ($E_{Cd}$) tap ($P_{Sc}E_{Cd}$), and a product of a prompt subcarrier ($P_{Sc}$) tap and a late code ($L_{Cd}$) tap ($P_{Sc}L_{Cd}$) as described above.

A coherent sum is produced for the tap data at operation 1210, and the resulting tap data is used to determine a region of phase error coordinates (e.g., within a stable tracking region) within the autocorrelation surface (FIGS. 5A-5B and 6A-6B) at operation 1215 in substantially the same manner described above. A routing step vector (RSV) is determined at operation 1220 based on the region of the phase error coordinates within the autocorrelation surface in substantially the same manner described above. The RSV includes information (e.g., a subcarrier phase (RSV_subcarrier) component and a code phase (RSV_code) component) to control or adjust numerically controlled oscillators (NCOs) to produce replica signals and codes for the tracking. When the phase error coordinates reside in a stable tracking region, the subcarrier and code phases are estimated in substantially the same manner described above. However, when the phase error coordinates do not reside in a stable tracking region, the subcarrier and code phases are determined based on correlation curves in substantially the same manner described above.

The routing step vector (RSV) is converted into controls (e.g., phase control words (PCW)) for subcarrier and code phase numerically controlled oscillators (NCOs) in substantially the same manner described above at operation 1220. This may be accomplished via a modulo operation (to obtain fractional phases) and quantization in accordance with a number of quantization bits used for the phase control words (PCWs). The tracking channel is updated with the computed subcarrier and phase NCOs in substantially the same manner described above. Each update constitutes one cycle for the tracking convergence process. Iteration of the process repeats from operation 1205 until a threshold number of consecutive estimated code phase (RSV_code) components of the routing step vector (RSV) has been obtained (e.g., indicating that the phase error coordinates remained in a stable tracking region with respect to a code correlation curve) as determined at operation 1225. This part of the two-dimensional (2D) routing process provides stable tracking with respect to the code correlation curve.

An average in time of the difference between code phase (Code_Phase) and subcarrier phase (Subcarrier_Phase) estimates (or NCOs) (during steady-state) is determined at operation 1230 (e.g., ignore the initial transient part of code and subcarrier phase estimates). For example, steady-state may be a condition under which phase bias estimates are equal to a sum of a constant and zero-mean noise fluctuation. The phase bias is determined based on the average at operation 1235. The phase bias may be used for the tracking (or subcarrier phase ambiguity resolution (SCPAR)) of present embodiments as described above (FIG. 8). By way of example, the phase bias estimation may be performed at initialization (or during operational states) of the system, and the phase bias may be stored as an entry in a look-up table indexed by a front-end signal processing configuration. The look-up table may be accessed during tracking to obtain the corresponding phase bias.

Other binary offset carrier (BOC) tracking architectures may also use phase bias data. For example, single estimator (SE) BOC tracking uses a product of code and subcarrier reference signals as BOC replica code and tracks the BOC signal like C/A- or P-code tracking. Without a proper alignment of code and subcarrier phases to account for upstream dispersive effects, tracking performance suffers from less jamming tolerance and higher code noise.

An example of a computing device 1300 (e.g., implementing the tracking techniques according to present embodiments, etc.) is illustrated in FIG. 13. The example computing device may perform the functions of embodiments described herein. Computing device 1300 may be implemented by any personal or other type of computer or processing system (e.g., embedded processor, microprocessor, controller, etc.), and may be used for any computing environments (e.g., embedded, local, network computing, stand-alone systems, etc.).

Computing device 1300 may include one or more processors 1305 (e.g., microprocessor, controller, central processing unit (CPU), etc.), network interface 1360, memory 1335, a bus 1310, and an Input/Output interface 1320. Bus 1310 couples these components for communication, and may be of any type of bus structure, including a memory bus or memory controller, a peripheral bus, and a processor or local bus using any of a variety of conventional or other bus architectures. Memory 1335 is coupled to bus 1310 and typically includes computer readable media including volatile media (e.g., random access memory (RAM), cache memory, etc.), non-volatile media, removable media, and/or non-removable media. For example, memory 1335 may include storage 1350 containing nonremovable, non-volatile media.

Moreover, memory 1335 includes a set of program modules 1315 that are configured to perform functions of embodiments described herein. The memory may further include an operating system, at least one application and/or other modules, and corresponding data. These may provide an implementation of a networking environment.

Input/Output interface 1320 is coupled to bus 1310 and communicates with one or more peripheral or external devices 1330 (e.g., a keyboard, mouse or other pointing device, a display, sensing devices, etc.), at least one device that enables a user to interact with computing device 1300, and/or any device (e.g., network card, modem, etc.) that enables computing device 1300 to communicate with one or more other computing devices. Computing device 1300 may communicate with one or more networks (e.g., a local area network (LAN), a wide area network (WAN), a public network (e.g., the Internet), etc.) via network interface 1360 coupled to bus 1310.

With respect to certain entities, computing device 1300 may further include, or be coupled to, a touch screen or other display 1325 and/or a keypad or keyboard 1355 to enter information (e.g., alphanumeric information, etc.). These items may be coupled to bus 1310 or Input/Output interface 1320 to transfer data with other elements of computing device 1300.

In an embodiment, a receiver is configured for receiving a global navigation satellite system (GNSS) signal comprising a carrier modulated by a code modulation function of a given code rate and further modulated by a subcarrier modulation function. The receiver comprises a reference code signal generator arranged to generate a reference code signal, a reference subcarrier signal generator arranged to generate a reference subcarrier signal, and a processor or hardware accelerator. The processor is configured to use a situation-aware two-dimensional routing algorithm to converge to stable tracking, and to track final subcarrier and code phases.

In an embodiment, the situation-aware 2D routing algorithm includes iteratively performing a process including determining of which region, the current 2D phase error is in by using 2D correlation data, using this regional information and 2D correlation data to calculate a situation-aware routing step vector (RSV), updating subcarrier and code phase numerically controlled oscillators (NCOs) calculated in accordance with the RSV, and exiting iteration upon reaching stable tracking.

In an embodiment, regional determination comprises: selecting I or Q component of a subcarrier tap triplet, $\{E_{Sc}P_{Cd}, L_{Sc}P_{Ca}, P_{Sc}P_{Ca}\}$, in accordance with a larger magnitude of the I or Q of $P_{Sc}P_{Ca}$, and when the selected I or Q of the triplet all have the same sign, then a candidate stable tracking region is present. Otherwise, a candidate stable tracking region is not present.

In an embodiment, a subcarrier phase component of RSV (RSV_subcarrier) is calculated by estimating the RSV_subcarrier when a candidate stable tracking region is present. Otherwise, a subcarrier phase pull-in is performed with math derived in accordance with a subcarrier correlation curve.

In an embodiment, a code phase component of RSV (RSV_code) is calculated by estimating the RSV_code or setting the RSV_code to zero pending a threshold test when a candidate stable tracking region is present. Otherwise, code phase pull-in is performed using math derived in accordance with code correlation curve. When the RSV_code is estimated, the RSV_code is further bias-compensated with an RSV_subcarrier. When a threshold number of consecutive estimated RSV_code has been obtained, a stable tracking condition is declared.

In an embodiment, the subcarrier and code phase estimates are smoothed upon being in a candidate stable tracking region.

In an embodiment, the final subcarrier and code phases are tracked to subcarrier and code correlation curves, respectively.

In an embodiment, tracking the final subcarrier and code phases comprises performing half-chip subcarrier phase ambiguity resolution, and tracking both subcarrier and code phases more accurately to a subcarrier correlation curve.

In an embodiment, subcarrier phase ambiguity resolution is performed by comparing estimated code phase to subcarrier phase with or without a half-chip adjustment.

In an embodiment, tracking to a subcarrier correlation curve is performed by setting the code phase estimate to:

$$\text{Code Phase Estimate=Code\_Phase\_Integer\_Chips+} \\ \text{Subcarrier\_Phase\_Fractional\_Chips+Phase\_Bias.}$$

In an embodiment, the subcarrier phase ambiguity resolution is required to meet an integrity allocation to support high integrity applications.

In an embodiment, channel time and ranging measurements are provided.

In an embodiment, instead of tracking to a code correlation curve, concurrently track code and subcarrier phases to their respective curves with smoothing, compute phase bias by taking average in time of the difference between two phase estimates, and output phase bias.

Present embodiments include a method and computer program product (including computer readable media with program instructions executable by one or more processors) for performing the above operations of the receiver.

The hardware environment of the embodiments may include any number of computer or other processing systems (e.g., computing devices, etc.) and repositories arranged in any desired fashion, where the embodiments may be applied to any desired type of computing environment. The computing or other processing systems employed by the embodiments may be implemented by any number of any type of computer or processing system (e.g., microprocessor, controller, embedded processor, hand-held devices, etc.), and may include any commercially available operating system. These systems may include any types of monitors and input devices (e.g., keyboard, mouse, voice recognition, etc.) to enter and/or view information.

It is to be understood that the software of the embodiments (e.g., program modules 1315 implementing the functions of present embodiments described herein, etc.) may be implemented in any desired computer language and could be developed by one of ordinary skill in the computer arts based on the functional descriptions contained in the specification and flow diagrams illustrated in the drawings. Further, any references herein of software performing various functions generally refer to computer systems or processors performing those functions under software control. The computer systems of the embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the embodiments may be distributed in any manner among the various computing devices and and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the embodiments (e.g., program modules 1315 implementing the functions of present embodiments described herein, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium. The computer useable or readable medium (or media) may include instructions executable by one or more processors to perform functions of embodiments described herein.

A communication network may be implemented by any number of any type of communications network (e.g., LAN, WAN, Internet, Intranet, VPN, etc.). The computer or other processing systems of the embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardware, wireless link, Intranet, etc.).

The system may employ any number of any conventional or other databases, data stores or storage structures (e.g., files, databases, data structures, data or other repositories, etc.) to store information. The database may be implemented by any number of any conventional or other databases, data stores or storage structures to store information. The database may be included within or coupled to the server. The database and/or storage structures may be remote from or local to the computer or other processing systems, and may store any desired data.

In summary, in one aspect, a method of tracking a signal modulated by a code and subcarrier comprising: determining a region within subcarrier and code error for the signal based on subcarrier and code correlation data of the signal; determining an update for a reference subcarrier and a reference code for correlation with the signal based on the determined region and subcarrier and code correlation data; and modifying the reference subcarrier and the reference code based on the update to track the signal.

In another aspect, a system for tracking a signal modulated by a code and subcarrier comprising: one or more memories; and a processor coupled to the one or more memories and configured to: determine a region within subcarrier and code error for the signal based on subcarrier and code correlation data of the signal; and track the signal by determining an update based on the determined region and subcarrier and code correlation data.

In another aspect, a computer program product for tracking a signal modulated by a code and subcarrier, the computer program product comprising one or more computer readable media having instructions stored thereon, the instructions executable by a processor to cause the processor to: determine a region within subcarrier and code error for the signal based on subcarrier and code correlation data of the signal; and track the signal by determining an update based on the determined region and subcarrier and code correlation data.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of tracking a signal modulated by a code and subcarrier comprising:

determining a subcarrier error from subcarrier correlation data produced from the signal and a reference subcarrier;

determining a code error from code correlation data produced from the signal and a reference code;

determining a region containing the subcarrier error and the code error within an autocorrelation surface for the signal from the subcarrier correlation data and the code correlation data of the signal;

determining an update for the reference subcarrier and the reference code for correlation with the signal from the determined region, the subcarrier correlation data, and the code correlation data; and modifying the reference subcarrier and the reference code based on by the update to track the signal.

2. The method of claim 1, wherein determining the region comprises:

selecting a signal component of each tap of a set of taps for the subcarrier correlation data and the code correlation data based on a magnitude of signal components of a specific tap, wherein the signal components of the set of taps include in-phase and quadrature components; and when the selected signal component of each tap has a same sign, the determined region includes a stable tracking region.

3. The method of claim 1, wherein determining the update comprises:

determining routing step information based on the determined region, wherein the routing step information includes subcarrier information and code information; and controlling numerically controlled oscillators in accordance with the routing step information to generate the reference subcarrier and the reference code.

4. The method of claim 3, wherein determining the routing step information comprises:

estimating the subcarrier information, via a discriminator, when the determined region includes a stable tracking region; and determining the subcarrier information based on a subcarrier correlation curve when the determined region includes an unstable tracking region.

5. The method of claim 3, wherein determining the routing step information comprises:

estimating the code information, via a discriminator, and bias-compensating the code information with the subcarrier information when the determined region includes a stable tracking region; and determining the code information based on a code correlation curve and its usability in providing code information when the determined region includes an unstable tracking region.

6. The method of claim 5, further comprising:

indicating tracking to the code correlation curve after obtaining a threshold number of consecutive estimates for the code information with the determined region including a stable tracking region.

7. The method of claim 1, further comprising:

performing half-chip subcarrier phase ambiguity resolution by comparing an estimated code phase of the signal to a subcarrier phase of the signal; and tracking subcarrier and code phases to a subcarrier correlation curve.

8. The method of claim 7, wherein tracking the subcarrier and code phases to the subcarrier correlation curve comprises setting the code phase according to:

$$\text{Code Phase} = \text{Code\_Phase\_Integer\_Chips} + \text{Subcarrier\_Phase\_Fractional\_Chips} + \text{Phase\_Bias},$$

where Code_Phase_Integer_Chips is a whole integer part of a code phase in subcarrier chips, Subcarrier_Phase_Fractional_Chips is an estimated fractional part of a subcarrier phase, and Phase_Bias is bias introduced from a configuration and environmental conditions.

9. The method of claim 7, wherein the subcarrier phase ambiguity resolution ensures that a magnitude of a difference of fractional code and subcarrier phase estimates minus phase bias is less than a threshold value in accordance with a high integrity allocation for a low probability of half-chip errors.

10. The method of claim 1, further comprising determining a phase bias estimation when operating in a phase bias estimation mode, wherein determining the phase bias estimation comprises:

concurrently tracking code and subcarrier phases to respective code and subcarrier correlation curves with smoothing; and determining the phase bias estimation based on an average in time of a difference between code and subcarrier phase estimates upon reaching a steady-state condition.

11. A system for tracking a signal modulated by a code and subcarrier comprising:

one or more computing device memories; and a processor coupled to the one or more computing device memories and configured to:

determine a subcarrier error from subcarrier correlation data produced from the signal and a reference subcarrier;

determine a code error from code correlation data produced from the signal and a reference code;

determine a region containing the subcarrier error and the code error within an autocorrelation surface for the signal from the subcarrier correlation data and the code correlation data of the signal; and track the signal by determining an update for the reference subcarrier and the reference code from the determined region, the subcarrier correlation data, and the code correlation data.

12. The system of claim 11, wherein determining the update comprises:

estimating subcarrier information, via a discriminator, when the determined region includes a stable tracking region; and determining the subcarrier information based on a subcarrier correlation curve when the determined region includes an unstable tracking region.

13. The system of claim 12, wherein determining the update comprises:

estimating code information, via a discriminator, and bias-compensating the code information with the subcarrier information when the determined region includes a stable tracking region; and determining the code information based on a code correlation curve and its usability in providing code information when the determined region includes an unstable tracking region.

14. The system of claim 11, wherein the processor is further configured to:

perform half-chip subcarrier phase ambiguity resolution by comparing an estimated code phase of the signal to a subcarrier phase of the signal; and track subcarrier and code phases to a subcarrier correlation curve, wherein tracking the subcarrier and code phases to the subcarrier correlation curve comprises setting the code phase according to:

Code Phase=Code_Phase_Integer_Chips+Subcarrier_
Phase_Fractional_Chips+Phase_Bias, where Code_Phase_Integer_Chips is a whole integer part of a code phase in subcarrier chips, Subcarrier_Phase-_Fractional_Chips is an estimated fractional part of a subcarrier phase, and Phase_Bias is bias introduced from a configuration and environmental conditions.

15. The system of claim 11, wherein the processor is further configured to:

determine a phase bias estimation when operating in a phase bias estimation mode, wherein determining the phase bias estimation comprises:

concurrently tracking code and subcarrier phases to respective code and subcarrier correlation curves with smoothing; and determining the phase bias estimation based on an average in time of a difference between code and subcarrier phase estimates upon reaching a steady-state condition.

16. A non-transitory computer-readable medium comprising a computer program_for tracking a signal modulated by a code and subcarrier, which when executed on a processor, causes the processor to:

determine a subcarrier error from subcarrier correlation data produced from the signal and a reference subcarrier;

determine a code error from code correlation data produced from the signal and a reference code;

determine a region containing the subcarrier error and the code error within an autocorrelation surface for the signal from the subcarrier correlation data and the code correlation data of the signal; and track the signal by determining an update for the reference subcarrier and the reference code from the determined region, the subcarrier correlation data, and the code correlation data.

17. The non-transitory computer-readable medium of claim 16, wherein determining the update comprises:

estimating subcarrier information, via a discriminator, when the determined region includes a stable tracking region; and determining the subcarrier information based on a subcarrier correlation curve when the determined region includes an unstable tracking region.

18. The non-transitory computer-readable medium of claim 17, wherein determining the update comprises:

estimating code information, via a discriminator, and bias-compensating the code information with the subcarrier information when the determined region includes a stable tracking region; and determining the code information based on a code correlation curve and its usability in providing code information when the determined region includes an unstable tracking region.

19. The non-transitory computer-readable medium of claim 16, wherein the computer program further causes the processor to:

perform half-chip subcarrier phase ambiguity resolution by comparing an estimated code phase of the signal to a subcarrier phase of the signal; and track subcarrier and code phases to a subcarrier correlation curve, wherein tracking the subcarrier and code phases to the subcarrier correlation curve comprises setting the code phase according to:

Code Phase=Code_Phase_Integer_Chips+Subcarrier_
Phase_Fractional_Chips+Phase_Bias, where Code_Phase_Integer_Chips is a whole integer part of a code phase in subcarrier chips, Subcarrier_Phase-_Fractional_Chips is an estimated fractional part of a subcarrier phase, and Phase_Bias is bias introduced from a configuration and environmental conditions.

20. The non-transitory computer-readable medium of claim 16, wherein the computer program further causes the processor to:

determine a phase bias estimation when operating in a phase bias estimation mode, wherein determining the phase bias estimation comprises:

concurrently tracking code and subcarrier phases to respective code and subcarrier correlation curves with smoothing; and determining the phase bias estimation based on an average in time of a difference between code and subcarrier phase estimates upon reaching a steady-state condition.

\* \* \* \* \*